United States Patent
Endo et al.

(10) Patent No.: US 6,787,865 B2
(45) Date of Patent: Sep. 7, 2004

(54) PRESSING DIRECTION SENSOR AND INPUT DEVICE USING THE SAME

(75) Inventors: Michiko Endo, Shinagawa (JP); Yuriko Nishiyama, Shinagawa (JP); Ryoji Kikuchi, Shinagawa (JP); Norio Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 10/335,860

(22) Filed: Jan. 3, 2003

(65) Prior Publication Data

US 2003/0151103 A1 Aug. 14, 2003

(30) Foreign Application Priority Data

Feb. 14, 2002 (JP) .......................................... 2002-036175

(51) Int. Cl.[7] .............................................. H01L 29/84
(52) U.S. Cl. ......................... 257/414; 257/414; 257/415
(58) Field of Search ................................. 257/414, 415, 257/417; 345/161, 128, 162, 164

(56) References Cited

U.S. PATENT DOCUMENTS 5,689,285 A * 11/1997 Asher .......................... 345/161
5,831,596 A * 11/1998 Marshall et al. ............. 345/161
6,184,866 B1 * 2/2001 Schrum et al. .............. 345/161

FOREIGN PATENT DOCUMENTS

| JP | 6-139880 | 5/1994 |
| JP | 7-320597 | 12/1995 |
| JP | 11-203036 | 7/1999 |
| JP | 2001-210191 | 8/2001 |
| JP | 2001-311671 | 11/2001 |

* cited by examiner

*Primary Examiner*—David Nelms
*Assistant Examiner*—Thinh T Nguyen
(74) *Attorney, Agent, or Firm*—Staas & Halsey LLP

(57) ABSTRACT

A small and thin pressing direction sensor that can continually detect pressing directions in the angle range of 360 degrees is provided. This pressing direction sensor includes a ring-like resistive film pattern, a first electrode pattern, and a conductive member that electrically connects the resistive film pattern and the first electrode pattern when pressed. The voltage of the first electrode pattern represents the pressing direction. This pressing direction sensor may further include a second electrode pattern. A signal representing the pressing force can be obtained from the second electrode pattern when the pressed conductive member is brought into contact with the second electrode pattern.

19 Claims, 23 Drawing Sheets

PRESSING DIRECTION SENSOR AND INPUT DEVICE USING THE SAME

BACKGROUND OF THE INVENTION

1. Field of the Invention

The present invention relates to a device for inputting coordinate information into an electronic apparatus, and more particularly, to a pressing direction sensor that can detect pressing directions and pressing forces of a finger pointing on an operation unit.

2. Description of the Related Art

Devices for inputting coordinate information into electronic devices include pointing devices. Pointing devices have been widely used as coordinate input means in personal computers and game machines. In recent years, these pointing devices are sometimes seen on small-size apparatuses such as portable telephones and PDAs, and are therefore expected to become smaller, thinner, lighter, and less costly.

For portable telephones and PDAs, onscreen pointing systems used to be required to function only from side to side and up and down. However, as the amount of information to be handled on screen has increased, cursor operations that have been employed in personal computers are expected also in portable telephones and PDAs, so that pointing operations in any direction can be performed at a controllable speed.

Various types of coordinate input mechanisms have been developed as conventional pointing devices. Those coordinate input mechanisms include: a mechanism that employs a magnet to be inclined by finger pointing and a plurality of electromagnetic conversion devices; and a mechanism that employs an optical detection system. However, any of those types of mechanisms structurally requires a certain thickness, and of course has limitations on portable devices to which it can be mounted. There are flat input devices such as touch pads, but a flat input device requires a certain area because of the operation method of stroking the pad surface with a finger.

In general, pointing devices that employ resistive film patterns and conductive pressure-sensitive rubber can achieve decreases in size and thickness. Such pointing devices have been developed and disclosed in Japanese Unexamined Patent Publication Nos. 6-139880, 7-320597, 11-203036, 2001-210191, and 2001-311671.

SUMMARY OF THE INVENTION

It is therefore an object of the present invention to provide a small and thin pressing direction sensor that can continually detect pressing directions in the angle range of 360 degrees, having a different structure from the prior arts disclosed in the above described patent publications.

Another object of the present invention is to provide a pressing direction sensor that can detect pressing forces as well as pressing directions.

Yet another object of the present invention is to provide an electronic device that employs the above pressing direction sensor.

The above objects of the present invention are achieved by a pressing direction sensor including: a ring-like resistive film pattern; a first electrode pattern; and a conductive member that is electrically connected to the resistive film pattern and the first electrode pattern when pressed, the potential of the resistive film pattern at the point of contact of the conductive member with the resistive film pattern being outputted from the first electrode pattern, so as to detect a pressing direction.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiment of the present invention, with reference to the accompanying drawings.

(First Embodiment)

Figure 1A:
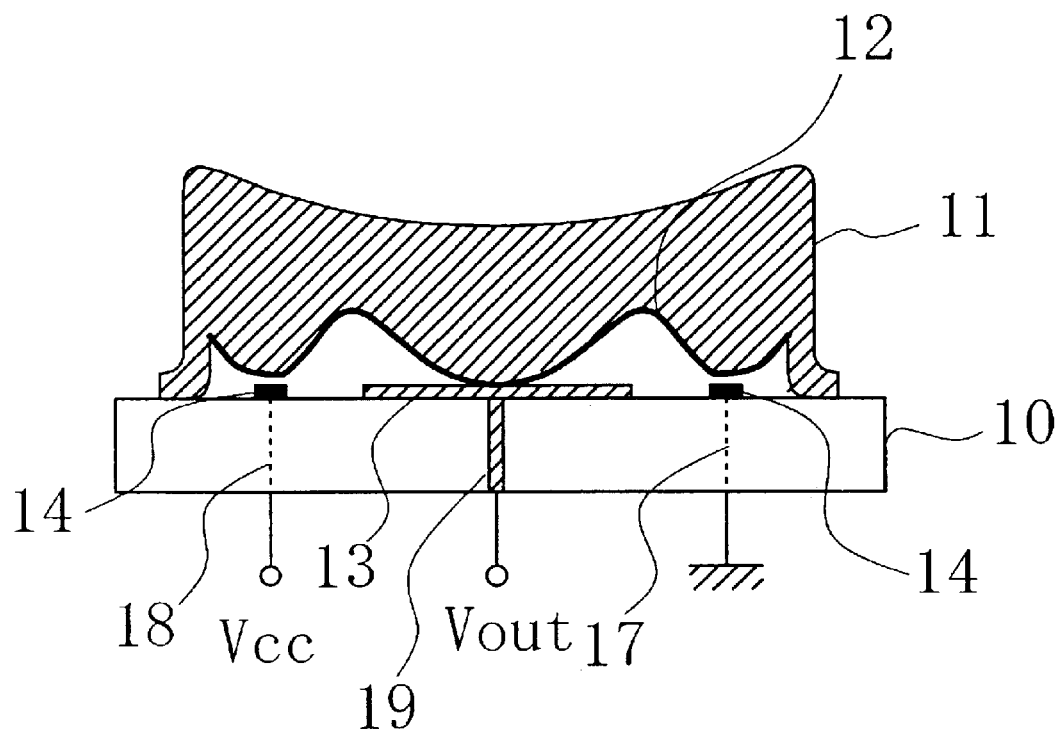
FIGS. 1A and 1B are sectional views of a pressing direction sensor according to a first embodiment of the present invention.
Figure 1B:
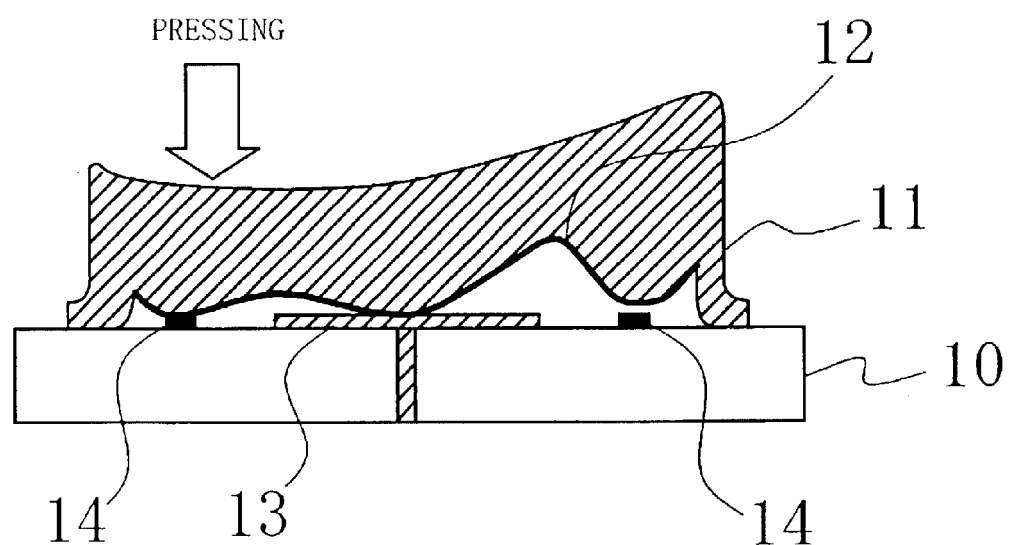

FIGS. 1A and 1B are sectional views of a pressing direction sensor according to the first embodiment of the present invention. FIG. 1A illustrates the stationary state of the sensor, and FIG. 1B illustrates the operation state of the sensor.

Figure 2:
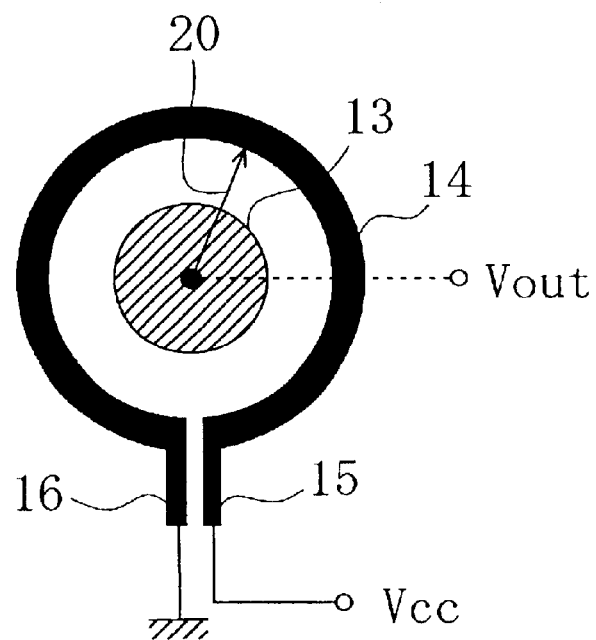
FIG. 2 illustrates a pattern formed on the printed wiring board of the pressing direction sensor shown in FIGS. 1A and 1B.

The pressing direction sensor shown in FIGS. 1A and 1B includes a printed wiring board 10 and a pressing member. Patterns shown in FIG. 2 are formed on the surface of the printed wiring board 10. A pattern 13 is a round electrode pattern, and a pattern 14 is a ring-shaped resistive film pattern surrounding the pattern 13. The printed wiring board is formed of an insulating material, and has the patterns 13 and 14 printed thereon. The resistive film 14 is a resistive carbon film having linear characteristics, for example. The center of the electrode pattern 13 corresponds to the center of the resistive film pattern 14. In other words, the electrode pattern 13 and the resistive film pattern 14 are concentrically arranged. The resistive film pattern 14 has a ring-like shape, with a part of the ring being notched. As a result, the resistive film pattern 14 has opening ends facing each other. Extraction electrodes 15 and 16 are formed at the opening ends. These extraction electrodes 15 and 16 extend to the bottom surface of the printed wiring board 10 via through holes 17 and 18 formed in the printed wiring board 10. A voltage Vcc is applied to the extraction electrode 15, and the extraction electro 16 is grounded. The electrode pattern 13 extends to the bottom surface of the printed wiring board 10 via a through hole 19 formed in the printed wiring board 10.

The pressing member 11 is placed on the printed wiring board 10, and the bottom surface of the pressing member 11 faces the electrode pattern 13 and the resistive film pattern 14. This bottom surface of the pressing member 11 is round, and gently sloped toward the center. As shown in FIG. 2, the bottom surface of the pressing member 11 is curved, and a conductive part 12 is formed on the curved portion. Of the curved portion, protrusions that protrude downward are located in the positions corresponding to the electrode pattern 13 and the resistive film pattern 14. In the stationary state shown in FIG. 1A, only the middle protrusion is in contact with the electrode pattern 13. The conductive part 12 may be a metal film. The pressing member 11 may be formed by resin. The pressing member 11 and the conductive part 12 may be replaced with a pressing member made of conductive rubber.

Figure 3:
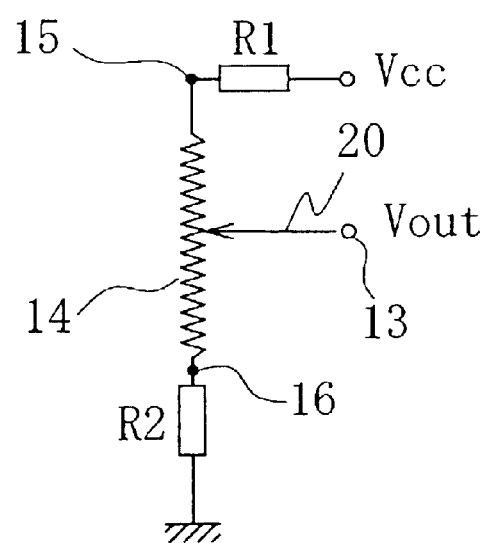
FIG. 3 is a circuit diagram illustrating the detection circuit of the pressing direction sensor shown in FIGS. 1A and 1B.

FIG. 3 is a circuit diagram illustrating the detection circuit of the pressing direction sensor shown in FIGS. 1A and 1B. The voltage Vcc is applied to one end of the resistive film pattern 14 via the extraction electrode 15, while the other end of the resistive film pattern 14 is grounded via the extraction electrode 16. The resistors R1 and R2 shown in FIG. 3 forms a voltage division circuit. In the stationary state, the electrode pattern 13 is not connected to the resistive film pattern 14. As shown in FIG. 1B, when the pressing member 11 is pressed in a certain direction, the conductive part 12 is brought into contact with the resistive film pattern 14. The arrow 20 in FIG. 2 indicates that the pressing member 11 is pressed so that the conductive part 12 is brought into contact with the resistive film pattern 14 at the position pointed out with the arrow 20. Thus, the electrode pattern 13 is electrically connected to the resistive film pattern 14 via the conductive part 12. As a result, a detection voltage Vout corresponding to the grounding position (or a potential corresponding to the grounding) appears on the electrode pattern 13. The closer the contact position is to the voltage Vcc, i.e., the extraction electrode 15, the higher the detection voltage Vout is. The size of the detection voltage Vout represents the contact position, i.e., the pressing direction.

In this manner, the pressing direction sensor according to the first embodiment of the present invention can detect the pressing direction in the angle range of 360 degrees. Moreover, this pressing direction sensor is made up of a small number of components, and is smaller and thinner than conventional sensors.

(Second Embodiment)

Figure 4A:
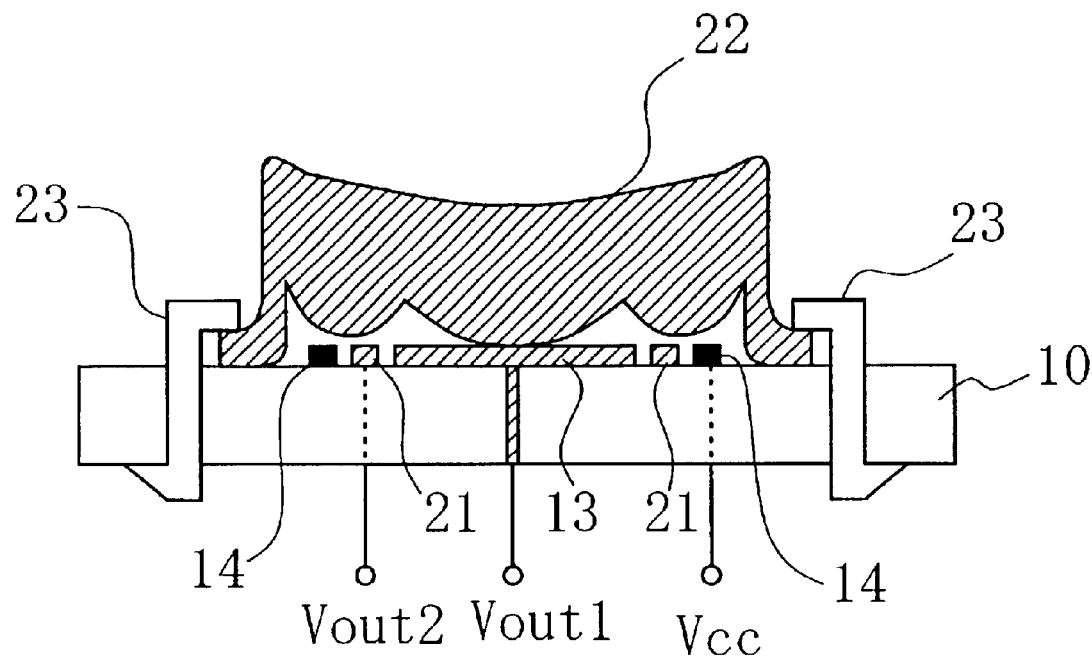
FIGS. 4A and 4B are sectional views illustrating a pressing direction sensor according to a second embodiment of the present invention.
Figure 4B:
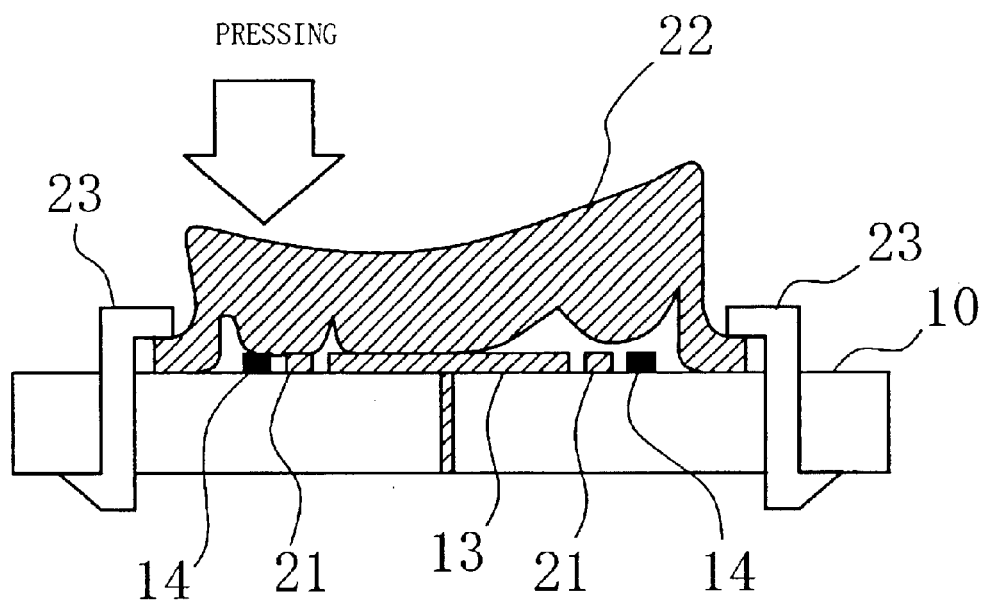
Figure 5:
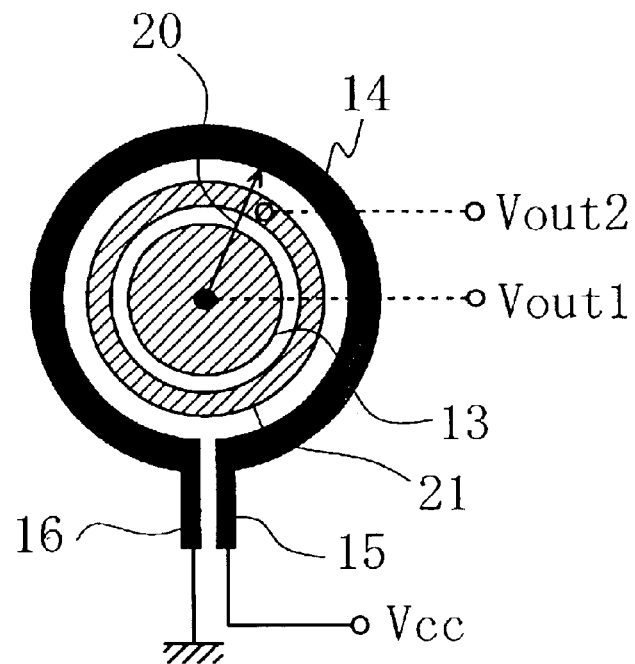
FIG. 5 illustrates a pattern formed on the printed wiring board of the pressing direction sensor shown in FIGS. 4A and 4B.
Figures 6A, 6B:
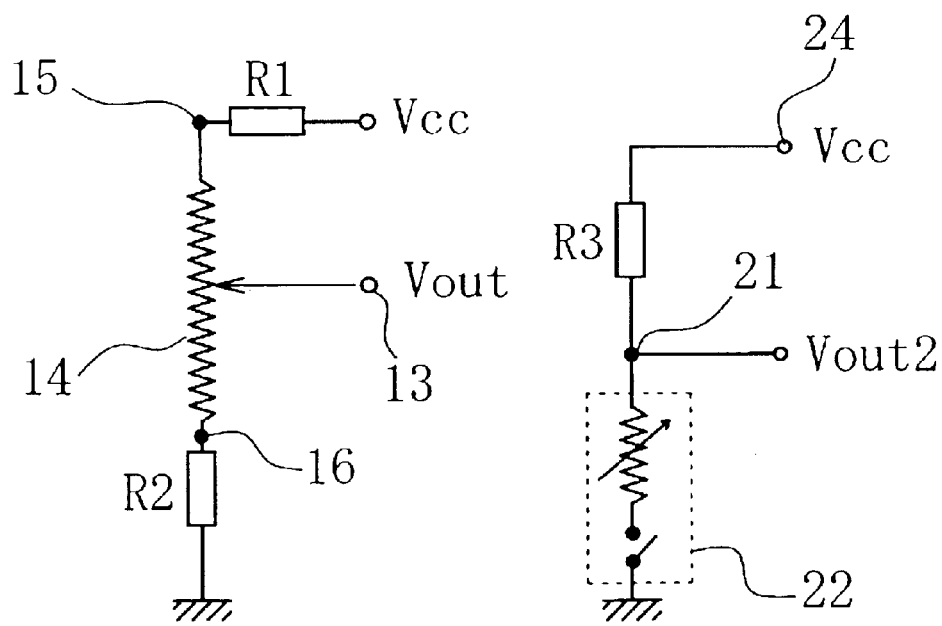
FIGS. 6A and 6B are circuit diagrams illustrating the detection circuit of the pressing direction sensor shown in FIGS. 4A and 4B.

FIGS. 4A and 4B are sectional view showing a pressing direction sensor according to a second embodiment of the present invention. FIG. 4A illustrates the stationary state of the pressing direction sensor, and FIG. 4B illustrates a pressed state thereof. In FIGS. 4A and 4B, the same components as descried in the first embodiment are denoted by like reference numerals. Further, FIG. 5 shows a pattern formed on the surface of the printed wiring board 10, and FIGS. 6A and 6B show the detection circuit. The pressing direction sensor according to the second embodiment is characterized by being able to detect pressing force as well as the pressing direction.

As shown in FIGS. 4A, 4B, and 5, the pressing direction sensor of this embodiment further includes a ring-like electrode pattern 21. Hereinafter, the above described electrode pattern 13 will be referred to as a first electrode pattern, and the electrode pattern 21 a second electrode pattern. The second electrode pattern 21 is situated outside the first electrode pattern 13, and inside the resistive film pattern 14. In other words, the second electrode pattern 21 is situated between the first electrode pattern and the resistive film pattern 14. The second electrode pattern 21 extends to the bottom surface of the printed wiring board 10 via a through hole formed in the printed wiring board 10.

A pressing member (also referred to as an operation unit) 22 is made of a conductive pressure-sensitive material, such as a conductive pressure-sensitive rubber, which has elasticity and a resistance value variable with pressures applied thereto. In general, a conductive pressure-sensitive rubber is compressed by a large pressure and reduces the resistance accordingly. The pressure member 22 is a round flat member. The surface of the pressure member 22 is gently sloped toward the center. The pressure member 22 is secured onto the printed wiring board 10 with a fixing member 23, which penetrates through the printed wiring board 10. The pressing member 22 has three protruding portions in section, and these protruding portions are in contact with the surface of the printed wiring board 10. The center protruding portion has a mountain-like shape, and a ring-like protruding portion is formed around the center protruding portion. This middle protruding portion is always in contact with the electrode pattern 13, and the other protruding portion is separate from the second electrode pattern 21 and the resistive film pattern 14 in the stationary state. As shown in FIG. 4B, when the pressing member 22 is pressed in a direction, the outer protruding portion is brought into contact with the resistive film pattern 14 and the electrode pattern 12. At this point, a voltage is applied to the second electrode pattern 21 via the voltage division circuit, so that a current can flow to the ground through the voltage division circuit and the pressing member 22. Thus, a detection voltage Vout2 corresponding to the size of the current appears on the electrode pattern 21.

FIGS. 6A and 6B illustrate the detection circuit of the pressing direction sensor according to the second embodiment of the present invention. FIG. 6A shows a circuit for detecting the pressing direction, which has the same circuit structure as the circuit structure shown in FIG. 3, except that the detection voltage Vout is detected from the electrode pattern 21. FIG. 6B shows a circuit for detecting a pressing force. The circuit shown in FIG. 6A is substantially the same as the circuit shown in FIG. 3, and therefore explanation for it is omitted herein. In FIG. 6, the pressing member 22 is shown as a variable resistor, being a conductive pressure-sensitive member that has a resistance value variable with pressures applied thereto. A switch that is connected in series with the variable resistor implies that the pressing member 22 is electrically connected to the second electrode pattern 21 when pressed. A voltage Vcc is applied to the second electrode pattern 21 via a resistor R3 for voltage division. The conductive pressing member 22 is grounded via the electrode pattern 13, for example. Since the resistance value of the pressing member 22 varies with pressures, the potential of the electrode pattern 21, i.e., the detection voltage Vout2 varies with the pressures. Accordingly, a pressure applied to the pressing member 22 can be detected from the detection voltage Vout2.

In the above manner, the pressing direction sensor according to the second embodiment of the present invention switches the connections to the terminals so as to obtain a pressing direction and the detection voltage corresponding to the pressing force in the circuit structures shown in FIGS. 6A and 6B. By doing so, this pressing direction sensor can detect pressing directions in the angle range of 360 degrees. Furthermore, this pressing direction sensor has a small number of components, and is smaller and thinner than the conventional sensors. If this pressing direction sensor is used as a pointer device for a personal computer, pressing force can be varied with the moving speed of the cursor.

(Third Embodiment)

Figure 7:
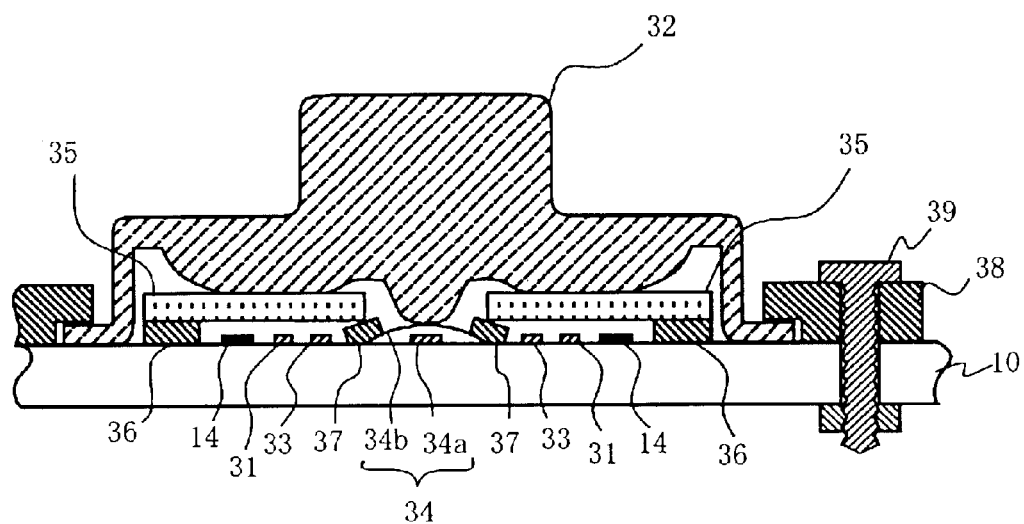
FIG. 7 is a sectional view illustrating a pressing direction sensor according to a third embodiment of the present invention.
Figure 8:
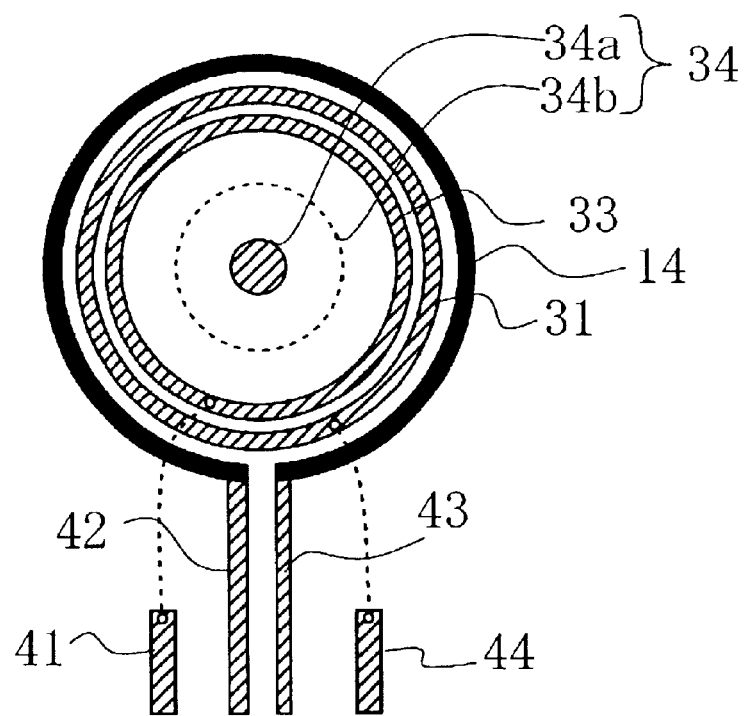
FIG. 8 illustrates a pattern formed on the printed wiring board of the pressing direction sensor shown in FIG. 7.

FIG. 7 is a sectional view of a pressing direction sensor according to a third embodiment of the present invention. FIG. 8 shows a pattern formed on the surface of the printed wiring board 10 shown in FIG. 7. This pressing direction sensor according to the third embodiment has a switch ON/OFF function, as well as the pressing direction detecting function and the pressing force detecting function.

As shown in FIG. 8, two ring-like electrode patterns 31 and 33 are formed inside the resistive film pattern 14. The resistive film pattern 14 and the electrode patterns 31 and 33 are concentrically arranged. The electrode pattern 31 is equivalent to the second electrode pattern 21 of the second embodiment, and the electrode pattern 33 is equivalent to the first electrode pattern 13 of the second embodiment. One end of an extended line from the electrode pattern 31 extends to the bottom surface of the printed wiring board 10 via a through hole formed in the printed wiring board 10, and is connected to an extraction electrode 44 formed on the upper surface of the printed wiring board 10 via the through hole. Likewise, one end of an extended line from the electrode pattern 33 extends to the bottom surface of the printed wiring board 10 via a through hole formed in the printed wiring board 10, and is connected to an extraction electrode 41 formed on the upper surface of the printed wiring board 10 via the through hole. The extraction electrodes 41 and 44 may be formed on the bottom surface of the printed wiring board 10. Further, the two facing ends of the resistive film pattern 14 are respectively connected to extraction electrodes 42 and 43 formed on the upper surface of the printed wiring board 10. The extraction electrodes 42 and 43 may be formed on the bottom surface of the printed wiring board 10.

The center of the pattern shown in FIG. 8 has a tactile switch 34 placed thereon. The tactile switch 34 consists of an electrode pattern 34a formed on the printed wiring board 10, and an elastic member 34b made of an arch-like conductive member. The elastic member 34b is separate from the electrode pattern 34a in the stationary state. When a vertical force is applied to the printed wiring board 10, the elastic member 34b is deformed and is electrically connected to the electrode pattern 34a. The electrode pattern 34a is connected to an extraction electrode formed on the bottom surface of the printed wiring board 10 via a through hole formed in the printed wiring board 10. Likewise, the elastic member 34b is connected to an extraction electrode formed on the bottom surface of the printed wiring board 10 via a through hole formed in the printed wiring board 10.

Figure 9:
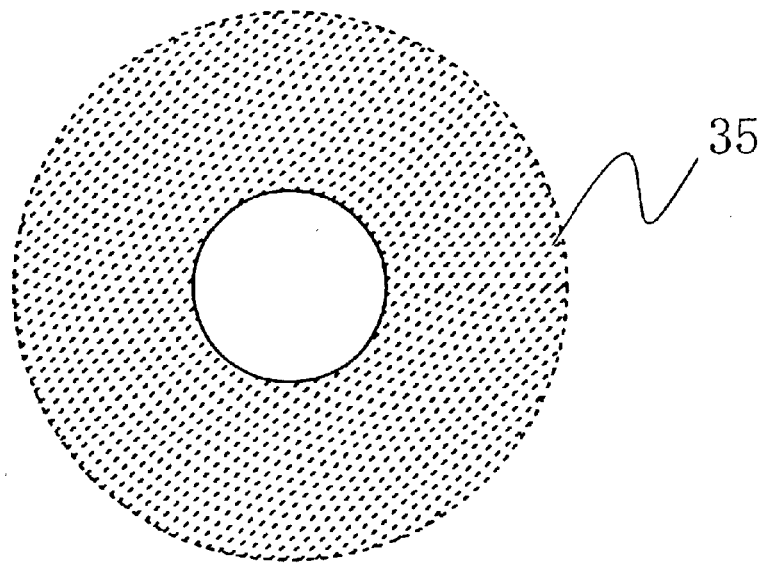
FIG. 9 illustrates a conductive pressure-sensitive rubber sheet employed in the pressing direction sensor shown in FIG. 7.

As shown in FIG. 7, two ring-like spacers 36 and 37 are provided on the printed wiring board 10. The spacer 36 is arranged outside the resistive film pattern 14, and the spacer 37 is arranged inside the electrode pattern 33. The spacer 37 is located on the elastic member 34b. Further, a ring-like conductive pressure-sensitive rubber sheet 35 shown in FIG. 9 is arranged on the two spacers 36 and 37. In the stationary state, the conductive pressure-sensitive rubber sheet 35 is separate from the resistive film pattern 14 and the electrode patterns 31 and 33. In this arrangement, the spacers 36 and 37 serves to maintain a predetermined distance between the conductive pressure-sensitive rubber sheet 35 and the patterns on the printed wiring board 10 in the stationary state.

As shown in FIG. 7, a pressing member (or an operation unit) 32 is further provided. The pressing member 32 is made of an insulating material such as resin, and is placed on the printed wiring board 10. The pressing member 32 has a flange portion that is in contact with the printed wiring board 10, and the flange portion is engaged with a holding member 38. The holding member 38 has a screw hole, and is secured to the printed wiring board 10 with a screw 39. Although not shown, another holding member is provided in the left half of FIG. 7. The pressing member 32 has an outward protruding portion and two inward (toward the printed wiring board 10) protruding portions. The center inward protruding portion is an angled protrusion that is in contact with the elastic member 34b in the stationary state. The other inward protruding portion has a ring-like shape and is located outside the angled inner protruding portion. This outer inward protruding portion is in contact with the conductive pressure-sensitive rubber sheet 35 in the stationary state.

Figures 10A, 10B:
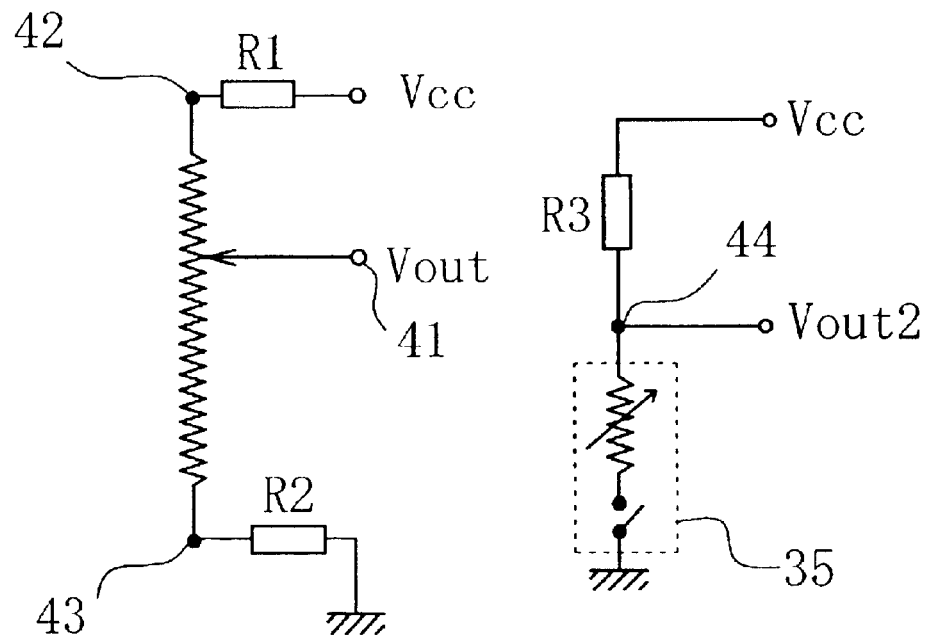
FIGS. 10A and 10B are circuit diagrams illustrating the detection circuit of the pressing direction sensor shown in FIG. 7.

FIGS. 10A and 10B illustrate the detection circuit of the pressing direction sensor according to this embodiment. FIG. 10A shows the circuit for detecting pressing direction. FIG. 10B shows the circuit for detecting pressing forces. The circuit shown in FIG. 10A is the same as the circuits shown in FIGS. 3 and 6A. In FIG. 10a, a voltage Vcc is applied to the extraction electrode 42 via a resistor R1 for voltage division. The extraction electrode 43 is grounded via a resistor R2 for voltage division. When the pressing member 32 is pressed in one direction, the conductive pressure-sensitive rubber sheet 35 is brought into contact with the resistive film pattern 14 and the electrode patterns 31 and 33. As a result, a detection voltage Vout1 corresponding to the contact position appears on the extraction electrode 41. In FIG. 10B, as the conductive pressure-sensitive rubber sheet 35 is brought into contact with the electrode pattern 31, a current flows through the conductive pressure-sensitive rubber sheet 35 via a resistor R3 for voltage division. As a result, a detection voltage Vout2 that is determined by the resistance value corresponding to the pressing force of the conductive pressure-sensitive rubber sheet 35 appears on the extraction electrode 44.

If the pressing member 32 is pressed vertically downward, the conductive elastic member 34b is brought into contact with the electrode pattern 34a, and the tactile switch 34 is turned on.

As described above, the pressing direction sensor according to the third embodiment of the present invention can detect pressing forces, as well as pressing directions in the angle range of 360 degrees. This pressing direction sensor can further detect ON/OFF states corresponding to vertical-direction operations. Moreover, this pressing direction sensor has a small number of components, and is therefore smaller and thinner than the conventional sensors.

Alternatively, the pressing member 32 and the conductive pressure-sensitive rubber sheet 35 may be integrally formed, and the entire pressing member 32 may be molded out of conductive pressure-sensitive rubber. In this case, the surface of the conductive pressure-sensitive rubber facing the printed wiring board 10 can be separated from the printed wiring board 10, and thereby the spacer 36 and 37 become unnecessary. Accordingly, the number of components can be further reduced, and a simpler structure can be realized.

(Fourth Embodiment)

Figure 11:
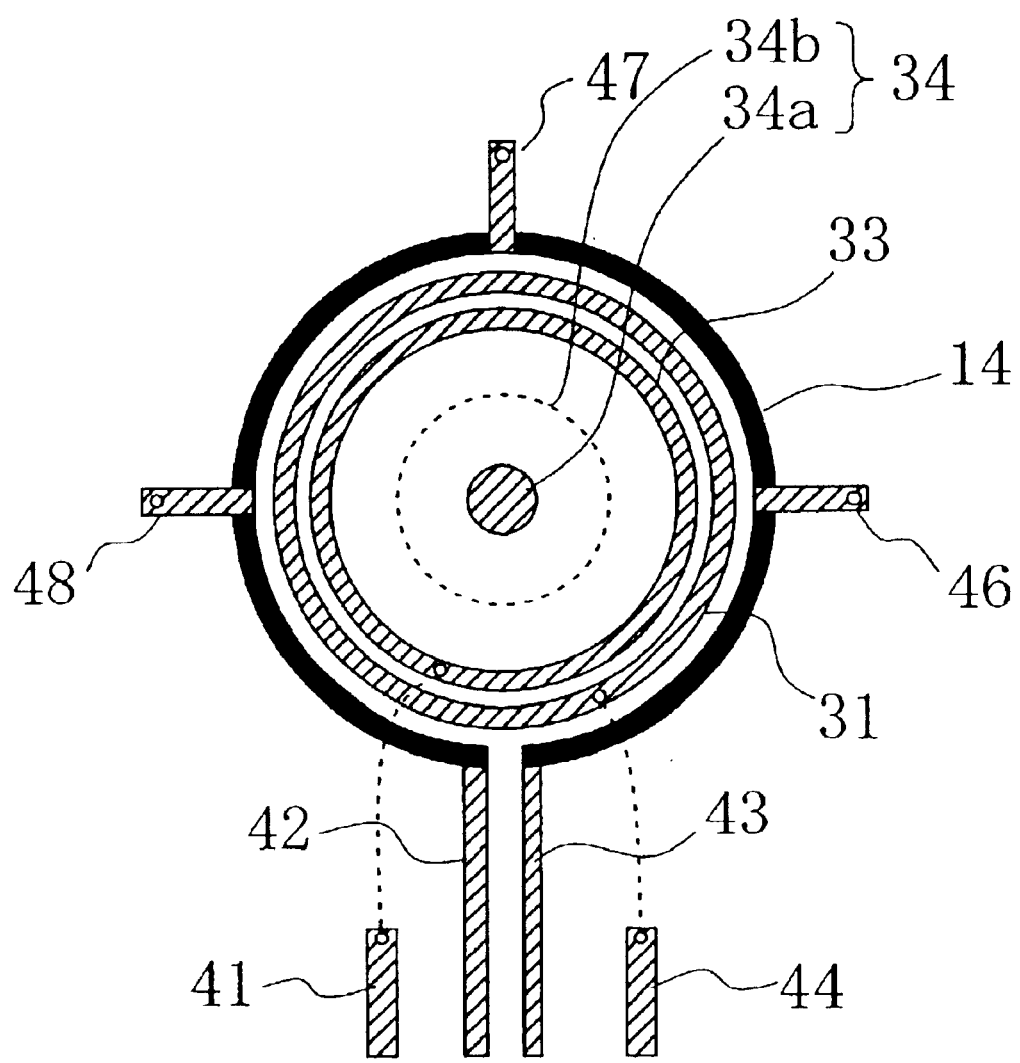
FIG. 11 illustrates a pattern formed in a pressing direction sensor according to a fourth embodiment of the present invention.

FIG. 11 illustrates the pattern of a pressing direction sensor according to a fourth embodiment of the present invention. In this figure, the same components as shown in FIG. 8 are denoted by the same reference numerals as in FIG. 8. The fourth embodiment is a modification of the third embodiment, and aims to further increase the accuracy in the pressing direction detecting operation.

As shown in FIG. 11, the resistive film pattern 14 has extraction electrodes 46, 47, and 48 at uniform intervals (every 90 degrees), as well as the extraction electrodes 42 and 43. When the voltage Vcc is applied to the extraction electrodes 42 and 43, a voltage corresponding to the distance from the opening end to which the extraction electrode 42 appears on the extraction electrodes 46, 47, and 48. If the potential difference between the extraction electrodes 47 and 48 is V, for instance, each voltage change is V/90. After the detection voltage Vout1 appears on the electrode pattern 33 as a result of the pressing of the pressing member 32 shown in FIG. 7 and the contact between the conductive pressure-sensitive rubber sheet 35 and the resistive film pattern 14, the voltages of the extraction electrodes 47 and 48 are compared so as to determine the pressing angle.

If the difference between the pressing angle determined in this manner and the pressing angle determined directly from the detection voltage Vout1 is larger than a predetermined value, an error signal may be outputted. Alternatively, the pressing angle determined through comparison among the extraction electrodes 46–48 may be outputted, instead of the pressing angle determined directly from the detection voltage Vout1.

As described above, the pressing direction sensor according to the fourth embodiment of the present invention can perform more accurate pressing direction detecting operations. The accuracy in pressing direction detection can also be increased by providing the extraction electrodes 46–48 shown in FIG. 11 to the resistive film pattern 14 shown in FIG. 5.

(Fifth Embodiment)

Figure 12A:
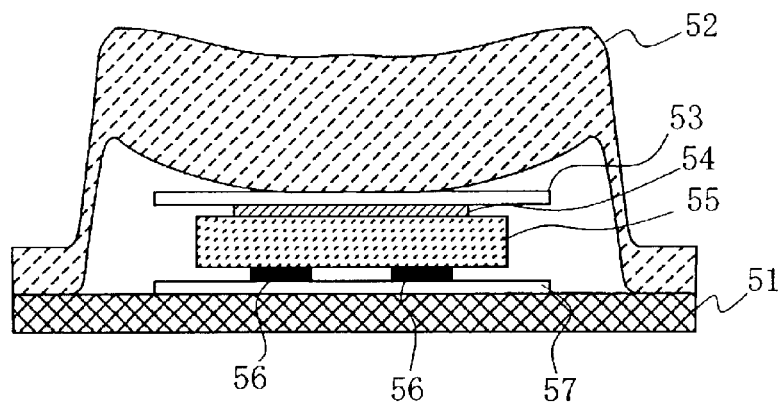
FIGS. 12A and 12B illustrate a pressing direction sensor according to a fifth embodiment of the present invention.
Figure 12B:
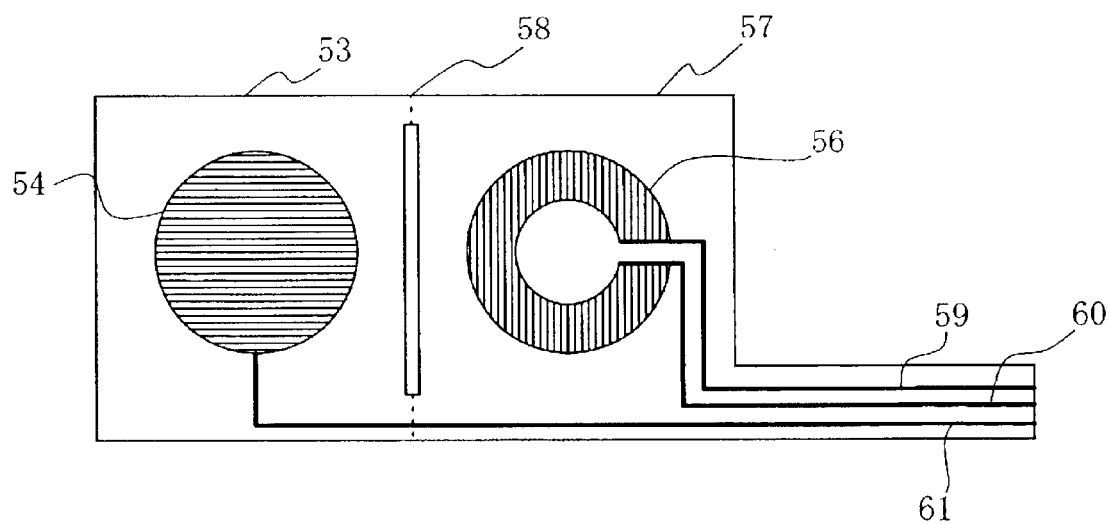

FIGS. 12A and 12B illustrate a pressing direction sensor according to a fifth embodiment of the present invention. FIG. 12A is a sectional view of the pressing direction sensor, and FIG. 12B shows a pattern formed on a membrane sheet. It should be noted that emphasis is put on the vertical direction in FIG. 12A, for ease of understanding. The fifth embodiment aims to detect pressing directions, and has the same detection principles as the first embodiment. One of the characteristics of the fifth embodiment is the formation of a pattern on a membrane sheet.

An operation unit 52 is provided on a support panel 51, and a conductive pressure-sensitive rubber 55 and rectangular membrane sheets 53 and 57 that sandwich the conductive pressure-sensitive rubber 55 are arranged between the bottom surface of the operation unit 52 and the support panel 51. The membrane sheet 57 is a PET film 100 $\mu$m thick, for example, and is fixed on the support panel 51 with an adhesive agent or the like. The exploded view of the membrane sheets 53 and 57 is shown in FIG. 12B. As shown in this figure, the membrane sheets 53 and 57 are formed by folding one membrane sheet at a folding portion 58. The membrane sheets 53 and 57 may be two separate sheets, instead of the integrally formed sheets shown in FIG. 12B. A round-shaped electrode pattern 54 is formed on the membrane sheet 53. On the other hand, a ring-like resistive film pattern 56 is formed on the membrane sheet 57. The resistive film pattern 56 has a notch, and extraction electrodes 59 and 60 are connected to the facing ends of the notch. The extraction electrodes 59 and 60, as well as an extraction electrode 61 connected to the electrode pattern 54, extend onto a rectangular protrusion of the membrane sheet 57. At this protrusion, electric connection with the outside is formed. As the membrane sheet 53 is placed over the membrane sheet 57 by the folding at the folding portion 58, the electrode pattern 54 and the resistive film pattern 56 are concentrically arranged. A disk-like conductive pressure-sensitive rubber 55 is interposed between the membrane sheets 53 and 57.

The resistive film pattern 56 can be formed by printing with carbon paste. The electrode pattern 54 and the extraction electrodes 59–61 can be formed by printing with Ag paste.

The detection circuit of the fifth embodiment has the same structure as the detection circuit shown in FIG. 3. A voltage Vcc and a ground voltage are applied to the extraction electrodes 59 and 60, respectively. When the pressing direction sensor is in the stationary state, the resistance value of the conductive pressure-sensitive rubber 55 is high. Therefore, no detection voltage appears on the extraction electrode 61 of the electrode pattern 54. On the other hand, when the conductive pressure-sensitive rubber 55 is pressed in one direction, the resistance value of the pressed point decreases, and a detection voltage appears on the extraction electrode 61. This detection voltage varies with points on the resistive film pattern 56 corresponding to pressed points of the conductive pressure-sensitive rubber 55. Accordingly, the detection voltage reflects the pressing direction.

As described above, in accordance with the fifth embodiment, there is no need to form a through hole in the support panel 51, and therefore the manufacturing of the pressing direction sensor can be facilitated. Also, since there is no need to form a pattern on a printed wiring board, various applications are possible.

(Sixth Embodiment)

Figure 13A:
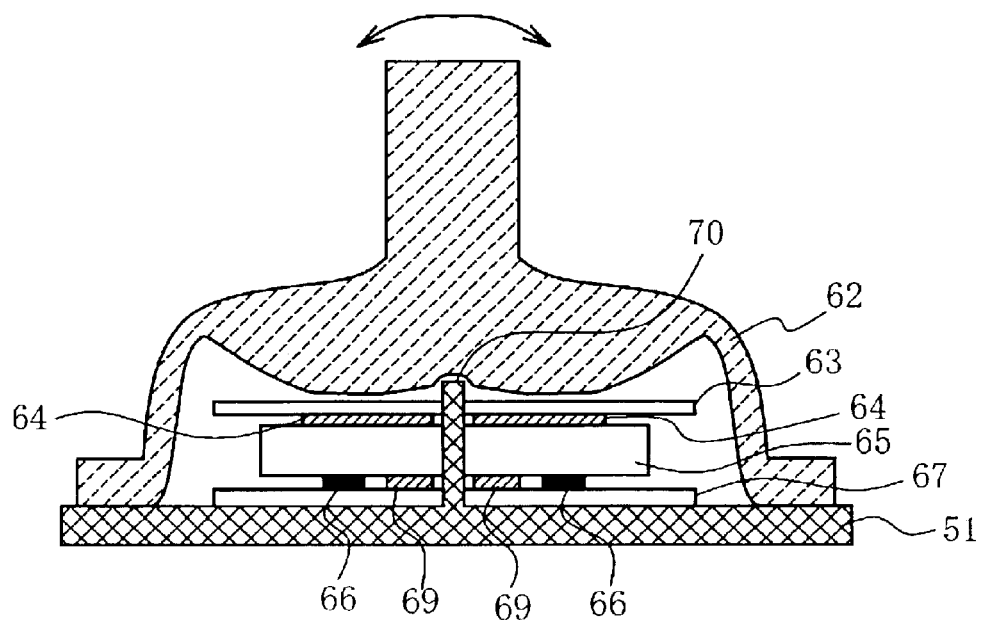
FIGS. 13A and 13B illustrate a pressing direction sensor according to a sixth embodiment of the present invention.
Figure 13B:
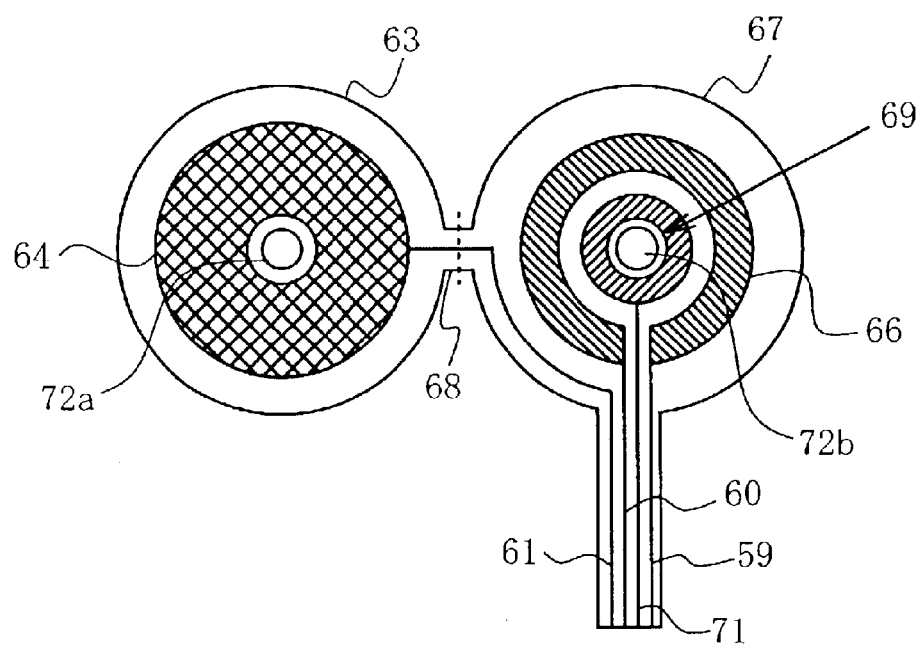

FIGS. 13A and 13B illustrate a pressing direction sensor according to a sixth embodiment of the present invention. FIG. 13A is a sectional view of the pressing direction sensor, and FIG. 13B shows a pattern formed on a membrane sheet. It should be noted that emphasis is put on the vertical direction in FIG. 13A, for ease of understanding. The sixth embodiment aims to detect pressing directions, and one of the characteristics of the sixth embodiment is the formation of a pattern on a membrane sheet.

An operation unit 62 is provided on a support panel 51, and a conductive pressure-sensitive rubber 65 and round-shaped membrane sheets 63 and 67 that sandwich the conductive pressure-sensitive rubber 65 are arranged between the bottom surface of the operation unit 62 and the support panel 51. The membrane sheet 67 is fixed on the support panel 51 with an adhesive agent or the like. The exploded view of the membrane sheets 63 and 67 is shown in FIG. 13B. As shown in this figure, the membrane sheets 63 and 67 are formed by folding one membrane sheet at a folding portion 68. The membrane sheets 63 and 67 may be two separate sheets, instead of the integrally formed sheets shown in FIG. 13B. A ring-like resistive film pattern 66 is formed on the membrane sheet 67, and a ring-like electrode pattern 69 is formed and arranged concentrically inside the resistive film pattern 66. Also, a ring-like resistive film pattern 64 is formed on the membrane sheet 63. The resistive film pattern 66 has a notch, and extraction electrodes 59 and 60 are connected to the facing ends of the notch. Also, an extraction electrode 71 is connected to the electrode pattern 69. The extraction electrodes 59, 60, and 71, as well as an extraction electrode 61 connected to the electrode pattern 64, extend onto a rectangular protrusion of the membrane sheet 67. At this protrusion, electric connection with the outside is formed. As the membrane sheet 63 is placed over the membrane sheet 67 by the folding at the folding portion 68, the electrode pattern 64, the resistive film pattern 66, and the electrode pattern 69 are concentrically arranged.

The ring-like conductive pressure-sensitive rubber 65 is interposed between the membrane sheets 63 and 67. A hole formed at the center of the conductive pressure-sensitive rubber 65 is positioned concentrically with holes 72a and 72b formed at the centers of the membrane sheets 63 and 67. A support member 70 protruding perpendicularly from the support panel 51 is inserted into these holes, so that the conductive pressure-sensitive rubber 65 and the membrane sheets 63 and 67 can be precisely positioned on the support panel 51.

The detection of pressing directions is performed in the same manner as in the fifth embodiment. The detection of a pressing force is performed by detecting the potential difference between the extraction electrodes 61 and 71. A voltage is applied to the electrode pattern 64 via a resistor R3 for voltage division, and the electrode pattern 69 is grounded, or vise versa. As the operation unit 62 is pressed in one direction, the resistance value of the conductive pressure-sensitive rubber 65 at the pressed point decreases, and a current flows through the conductive pressure-sensitive rubber 65. As a result, the potential of the electrode pattern 64 (or the extraction electrode 61) decreases accordingly. The potential of the electrode pattern 64 depends on the resistance value of the conductive pressure-sensitive rubber 65 between the electrode patterns 64 and 69, and reflects the pressing force.

As described above, in accordance with the sixth embodiment, there is no need to form a through hole in the support panel 51, and therefore the manufacturing of the pressing direction sensor can be facilitated. Also, since there is no need to form a pattern on a printed wiring board, various applications are possible.

(Seventh Embodiment)

Figure 14:
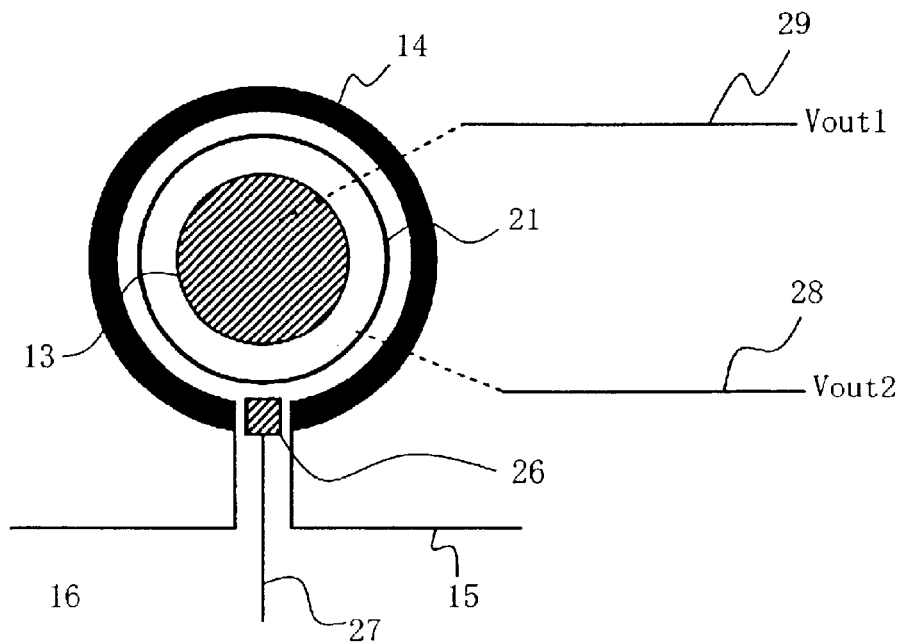
FIG. 14 illustrates a pattern formed in a pressing direction sensor according to a seventh embodiment of the present invention.

FIG. 14 shows a pattern of a pressing direction sensor according to a seventh embodiment of the present invention. In FIG. 14, the same components as shown in FIG. 5 are denoted by the same reference numerals as in FIG. 5. The seventh embodiment aims to further increase the pressing direction detecting accuracy of the second embodiment. In accordance with the second embodiment, the pressing direction of the notch portion (the opening) of the resistive film pattern 14 cannot be detected accurately. The seventh embodiment is to solve this problem, and is characterized by having a center switch function. This center switch function is turned on when the pressing member 22 is pressed vertically downward.

An electrode pattern 26 is provided between the facing opening ends of the resistive film pattern 14. An extraction electrode 27 is connected to the electrode pattern 26. When the pressing member 22 shown in FIGS. 4A and 4B presses the notch portion of the resistive film pattern 14 (i.e., the electrode pattern 26), the electrode pattern 21 is pressed as well. As a result, the electrode patterns 21 and 26 become conductive to each other via the pressing member made of conductive pressure-sensitive rubber of the like. By sensing this, the pressing direction that corresponds to the notch portion of the resistive film pattern 14 can be detected.

Figure 15:
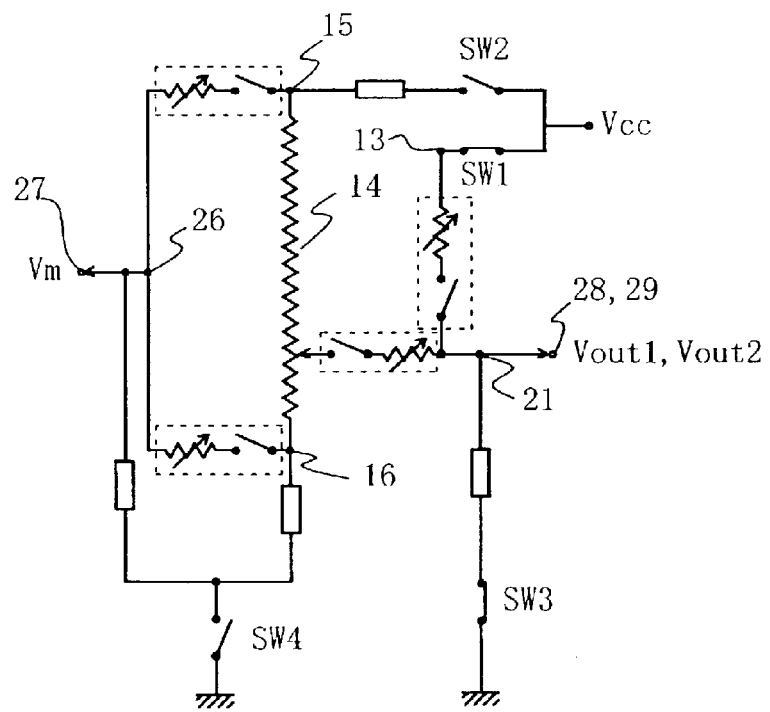
FIG. 15 illustrates the detection circuit of the pressing direction sensor according to the seventh embodiment of the present invention.

FIG. 15 shows the detection circuit according to this embodiment. The detection circuit is designed to prevent unnecessary current consumption, as well as to detect pressing directions. To avoid excessive current consumption, the detection circuit is provided with switches SW1 through SW4 and a center switch ON/OFF detecting function. In FIG. 15, the long rectangles represent a voltage division circuit, and the series circuits of variable resistors and switches indicated by the broken lines represent the pressing member 22 shown in FIGS. 4A and 4B. Vout 1 represents a voltage that appears on an extraction electrode 29 connected to the electrode pattern 13 and reflects a pressing direction. Vout 2 represents a voltage that appears on an extraction electrode 28 connected to the electrode pattern 21. In the circuit structure shown in FIG. 15, the extraction electrodes 28 and 29 are connected to a common terminal. A voltage Vm appears on the extraction electrode 27 connected to the electrode pattern 26. This voltage Vm appears when a pressed point on the pressing member 22 corresponds to the notch portion of the resistive film pattern 14, i.e., when the point over the electrode pattern 26 is pressed.

Figure 16:
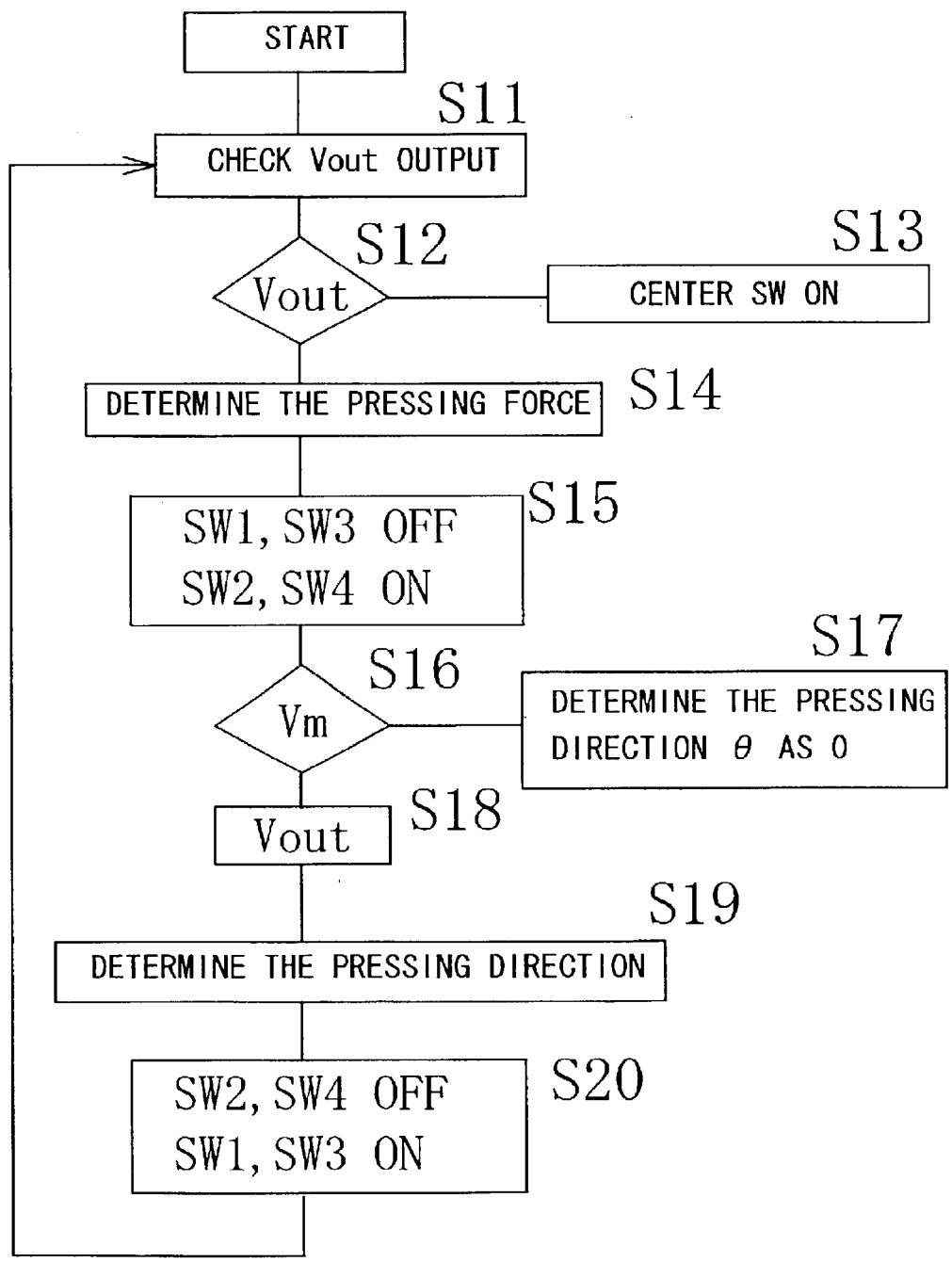
FIG. 16 is a flowchart showing the operation sequence of the detection circuit shown in FIG. 15.

FIG. 16 is a flowchart showing the operation sequence of the detection circuit shown in FIG. 15. In the initial state, the switches SW1 and SW3 are ON, and the switches SW2 and SW4 are OFF. In step S11, an output voltage Vout is recognized. As can be seen from the circuit diagram of FIG. 15, in the stationary state, the resistance of the pressing member 22 made of conductive pressure-sensitive rubber is high, and the switches shown within the broken-line blocks in FIG. 15 are OFF. Accordingly, no paths exist for a current flowing from a voltage Vcc toward the ground. When the pressing member 22 is pressed, the switches shown within the broken-line blocks are turned ON, and a current path that includes the switches SW1 and SW3 is formed.

Figure 17:
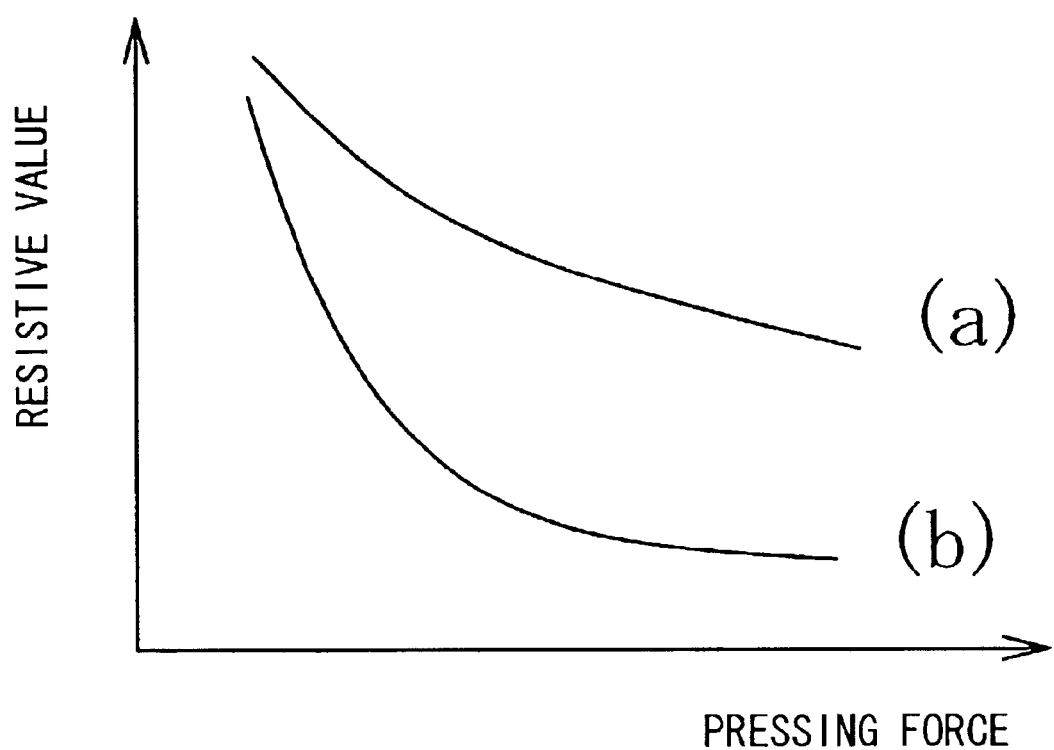
FIG. 17 is a graph illustrating the relationship between the pressing force and the resistance value of a pressing member made of conductive pressure-sensitive rubber.

In a case where the pressing member 22 is pressed vertically downward, the relationship between the pressing force and the resistance value of the pressing member 22 made of conductive pressure-sensitive rubber becomes as shown in the graph of FIG. 17. In this graph, a curve A represents the characteristics of a case where the pressing member 22 is pressed in any one direction, and a curve B represents the characteristics of a case where the pressing member 22 is pressed vertically downward. As can be seen from the graph, even if the pressing forces applied are the same, the pressing member 22 has a smaller resistance value when pressed vertically downward.

When the pressing member 22 is pressed vertically downward, the electrode patterns 13 and 21 become conductive to each other via the pressing member 22 that has conductivity over the entire circumference. At this point, the output voltage Vout has a value in accordance with the characteristics curve B of FIG. 17. This means that the output voltage Vout is a relatively high voltage. If an output voltage corresponding to a resistance value that can be used for distinguishing the curves A and B is set as a threshold voltage, an output voltage Vout of the curve A can be distinguished from an output voltage Vout of the curve B. If the output voltage Vout is higher than the threshold voltage (this output voltage will be hereinafter referred to as Vn) in step S12, it is determined in step S13 that the center switch has been turned ON. If the output voltage Vout is not higher than the threshold voltage, the center switch is determined to be OFF, and the operation moves on to step S14.

In step S14, a pressing force (a pressing strength) corresponding to the output voltage Vout is determined. In this case, the output voltage Vout is equivalent to the output voltage Vout2 shown in FIG. 14. In step S15, the switches SW1 and SW3 are turned OFF, and the switches SW2 and SW4 are turned ON instead. By doing so, a path running from the voltage Vcc to the resistive film pattern 14 and the switch SW4, and a path running from the voltage Vcc to the pressing member 22 and the switch SW4, are formed. In step S16, it is determined whether the voltage Vm of the electrode pattern 26 has appeared on the extraction electrode 27. If the voltage Vm is detected, the operation moves on to step S17, in which the pressing direction θ is of 0 degree. The point corresponding to the pressing direction θ of 0 degree is located on the electrode pattern 26. If the pressing direction θ is not of 0 degree, the operation moves on to step S18, in which the value of the detection voltage Vout (corresponding to the output voltage Vout1 shown in FIG. 14) is obtained. In step S19, the pressing direction corresponding to the detection voltage Vout is detected. Finally, in step S20, the switches SW1 through SW4 are put back into the initial state, and the operation comes to an end.

As described above, the pressing direction sensor according to the seventh embodiment of the present invention is provided with the function to detect the direction θ of 0 degree and the center switch function, as well as the functions to detect pressing directions and pressing forces. Furthermore, the pressing direction detection is performed, with the switches SW2 and SW4 being turned ON only after the output voltage Vout is recognized in step S11. Accordingly, the detection circuit of FIG. 15 does not consume current while the pressing member 22 is not being operated. In this manner, a small and thin pressing direction sensor that has a very high accuracy in detecting pressing directions, and is provided with the center switch function so as to save power consumption, can be realized in accordance with the seventh embodiment.

This embodiment is not limited to the combination with the pressing member 22, but may be combined with any of the embodiments that have already been described or will be described later. For example, this embodiment can be combined with the pressing member 11 having the conductive part 12 of the first embodiment. Also, the center switch function is applicable to any other embodiment (except for the embodiment employing a tactile switch).

The operation shown in the flowchart of FIG. 16 is performed by a central processing unit that will be described later and shown in FIG. 35.

(Eighth Embodiment)

Figure 18A:
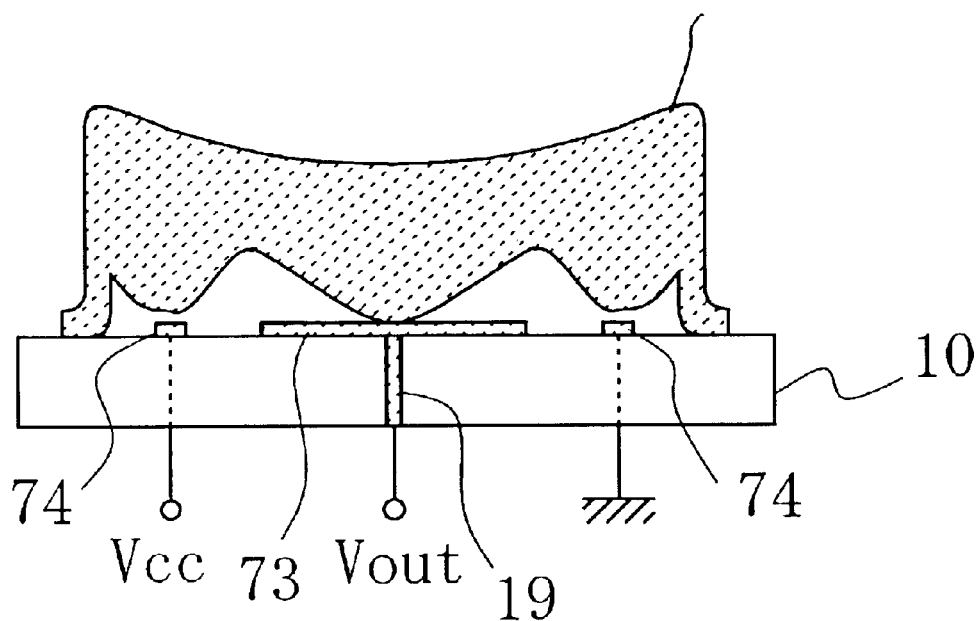
FIGS. 18A and 18B are sectional views illustrating a pressing direction sensor according to an eighth embodiment of the present invention.
Figure 18B:
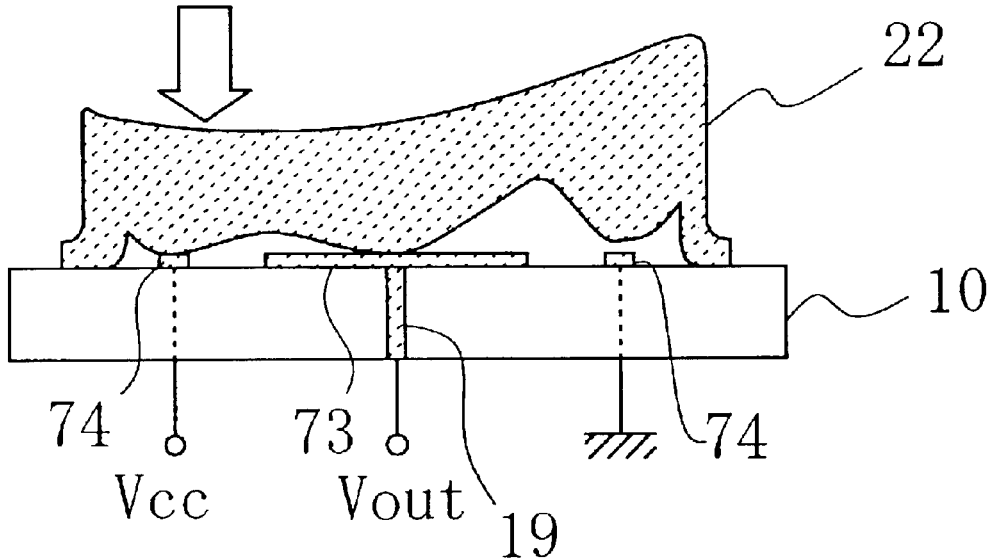
Figure 19:
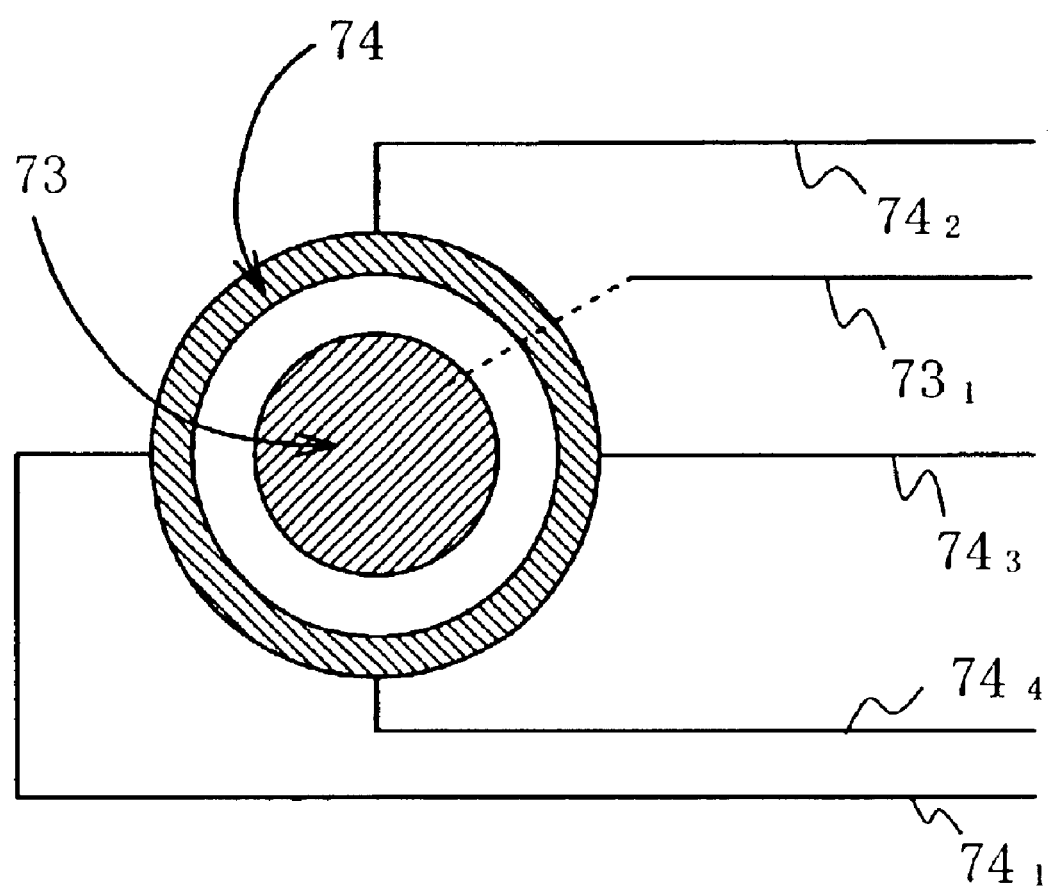
FIG. 19 illustrates a pattern formed on the printed wiring board of the pressing direction sensor shown in FIGS. 18A and 18B.

FIGS. 18A and 18B are sectional views illustrating a pressing direction sensor according to an eighth embodiment of the present invention. FIG. 18A shows the stationary state of the pressing direction sensor, and FIG. 18B shows an operation state of the pressing direction sensor. In these figures, the same components as in the foregoing embodiments are denoted by the same reference numerals as in the foregoing embodiments. FIG. 19 shows a pattern formed on the surface of the printed wiring board 10.

The pressing direction sensor according to this embodiment includes a resistive film pattern 74 of a complete ring shape. Four extraction electrodes $74_1$ through $74_4$ are connected to the resistive film pattern 74 at intervals of 90 degrees. These extraction electrodes $74_1$ through $74_4$ extend onto the bottom surface of the printed wiring via a through hole formed in the printed wiring board 10. The extraction electrodes $74_1$ and $74_3$ facing each other, and the extraction electrodes $74_2$ and $74_4$ facing each other, form two pairs of extraction electrodes. An electrode pattern 73 is concentrically formed inside the resistive film pattern 74. The electrode pattern 73 has an extraction electrode $73_1$ that extends onto the bottom surface of the printed wiring board 10 via a through hole formed in the printed wiring board 10.

Figure 20:
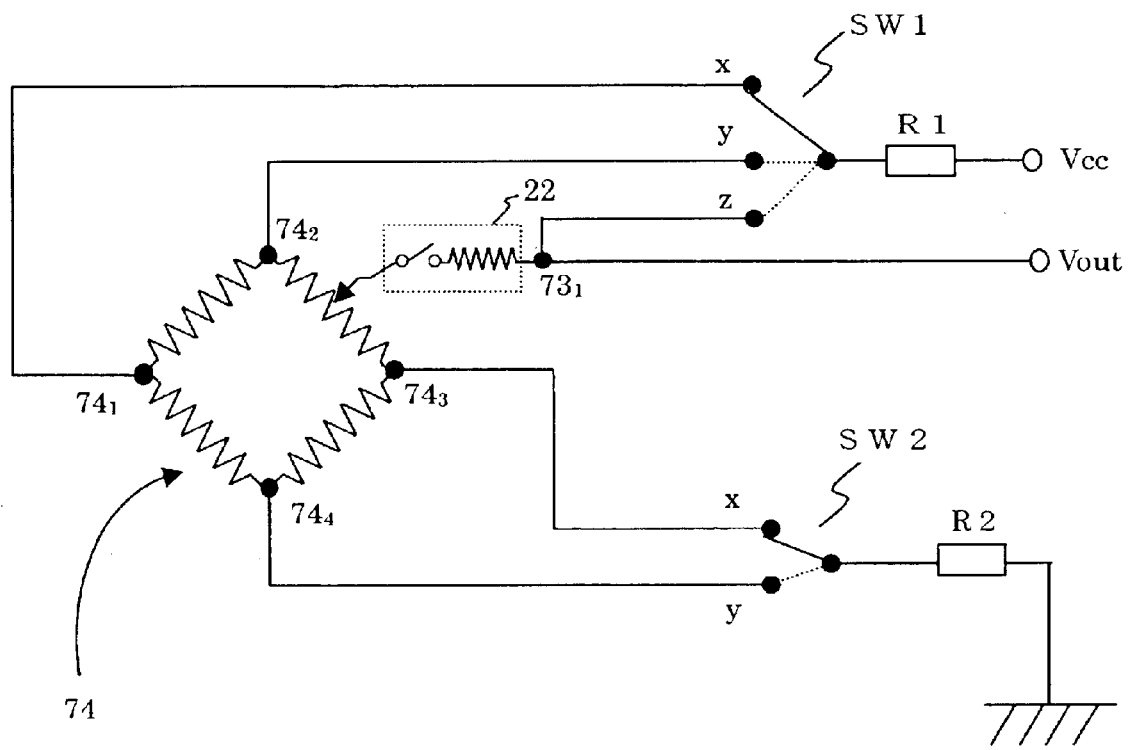
FIG. 20 illustrates the detection circuit of the pressing direction sensor according to the eighth embodiment of the present invention.

FIG. 20 shows a circuit diagram of the pressing direction sensor of this embodiment.

In the stationary state shown in FIG. 18A, the pressing member 22 made of conductive pressure-sensitive rubber or the like is in contact with the electrode pattern 73, but not with the resistive film pattern 74. As shown in FIG. 18B, when pressed in one direction, the pressing member 22 is brought into contact with the resistive film pattern 74. To detect this contact position (i.e., the pressing direction), a predetermined voltage is applied between the pair of extraction electrodes $74_1$ and $74_3$ via a resistor for voltage division, as the switches SW1 and SW2 are connected to contact points x in the circuit diagram of FIG. 20. More specifically, the voltage Vcc is applied to the extraction electrode $74_1$ via a resistor R1 for voltage division, and the extraction electrode $74_3$ is grounded via a resistor R2 for voltage division. At this point, the potential of the electrode pattern 73 is obtained through the conductive pressure-sensitive member (the pressing member) 22. This potential serves as the pressing point information relative to the straight line (hereinafter referred to as "X direction") connecting the extraction electrodes $74_2$ and $74_4$ when the pressing member 22 is in contact with the resistive film pattern 74. Since the pressing member 22 is made of a conductive pressure-sensitive material, the resistive film pattern 74 and the electrode pattern 73 are connected to each other with a resistor. The value of this resistor becomes smaller, as the pressing force of the conductive pressure-sensitive member becomes greater. Accordingly, the potential of the electrode pattern 73 also reflects the pressing force in a case where the switch SW1 is connected to a contact point z and the SW2 is connected to the contact point x in the circuit diagram of FIG. 20. Especially, as long as the resistance value of the conductive pressure-sensitive member is greater than the resistance value of the resistive film pattern 74, the variation of the resistance value of the resistive film pattern 74 with pressing points (i.e., the variation of the resistance value of the resistive film pattern 74 with the pressing points ranging from the contact point with the pressing member 22 to the extraction electrode $74_3$ in this example) can be ignored, and the pressing force detection can be performed accurately. Because of these facts, this embodiment is suitable for a structure having a resistive film pattern of a small diameter.

A predetermined voltage is next applied between the other pair of extraction electrodes $74_2$ and $74_4$ via a resistor for voltage division, and the potential of the electrode pattern 73 is obtained. This potential serves as the pressing position information relative to the straight line (hereinafter referred to as "Y direction") connecting the extraction electrodes $74_1$ and $74_3$, and also reflects pressing force.

In this manner, the position information relative to the X direction and the Y direction is obtained to detect pressing directions in the angle range of 360 degrees as well as pressing forces. In accordance with this embodiment, prior to the detecting operation, the potentials of the extraction electrodes $74_2$ and $74_4$ in a case where a predetermined voltage is applied between the extraction electrodes $74_1$ and $74_3$, and the potentials of the extraction electrodes $74_1$ and $74_3$ in a case where a predetermined voltage is applied between the extraction electrodes $74_2$ and $74_4$, are stored as the potential values at the positions of the respective electrodes, and are used for calibration. By doing so, more accurate pressing direction detection can be realized.

If the pressing member 22 is made of a conductive material, instead of a conductive pressure-sensitive material, only pressing directions can be detected.

(Ninth Embodiment)

Figure 21:
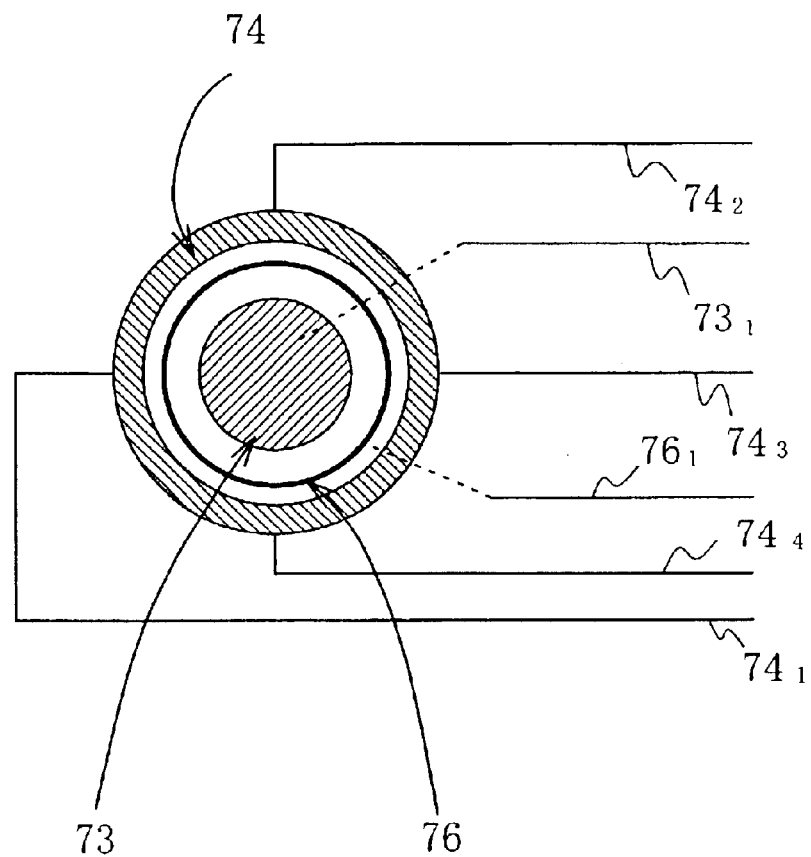
FIG. 21 illustrates a pattern formed in a pressing direction sensor according to a ninth embodiment of the present invention.

FIG. 21 shows a pattern of a pressing direction sensor according to a ninth embodiment of the present invention. In this figure, the same components as in the pattern shown in FIG. 19 are denoted by the same reference numerals as in FIG. 19. The pressing direction sensor according to the ninth embodiments is characterized by a ring-like electrode pattern 76 added to the pattern shown in FIG. 19, and detects a pressing force by detecting the resistance value of the pressing member 22 between the electrode patterns 73 and 76 at the time of pressing.

To detect a pressing force, the electrode pattern 76 is added to the pattern shown in FIG. 19. This electrode pattern 76 has a complete ring shape, and is interposed between the resistive film pattern 74 and the electrode pattern 73. The electrode pattern 76 has an extraction electrode $76_1$ that extends onto the bottom surface of the printed wiring board 10 via a through hole formed in the printed wiring board 10.

The pressing direction detection is performed in the same manner as in the eighth embodiment. The pressing force detection is performed in the same manner as in the structure shown in FIG. 6B. A voltage Vcc is applied to the electrode pattern 76 via a resistor for voltage division, so that the pressing force can be detected from the detection voltage that appears on the extraction electrode $76_1$ when the pressing member 22 is pressed. In this embodiment, it is not necessary to make the resistance value of the resistive film pattern 74 smaller than the resistance value of the conductive pressure-sensitive member as in the eighth embodiment, because the electrode pattern 76 is provided for detecting pressing forces. Accordingly, this embodiment is applicable to a structure having a resistive film pattern of a large diameter.

In this manner, the pressing direction sensor according to the ninth embodiment can detect pressing directions in the angle range of 360 degrees, as well as pressing forces. Furthermore, this pressing direction sensor has a small number of components, and is smaller and thinner than the conventional sensors.

(Tenth Embodiment)

Figure 22:
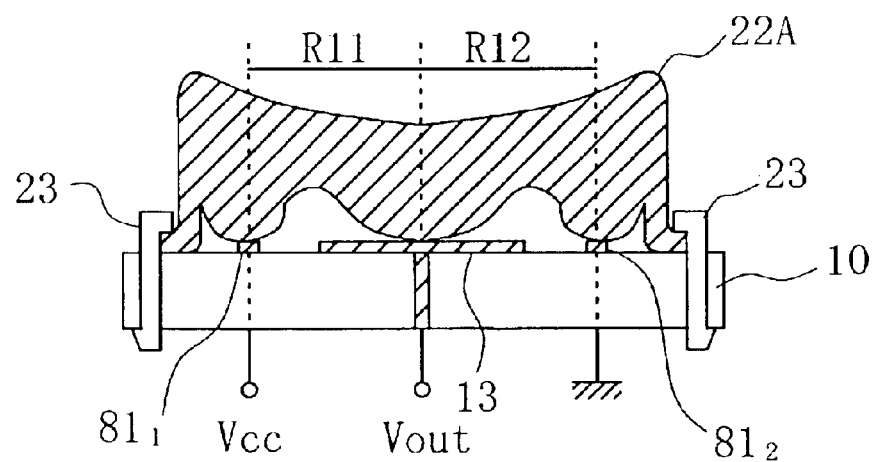
FIG. 22 is a sectional view of a pressing direction sensor according to a tenth embodiment of the present invention.

FIG. 22 is a sectional view of a pressing direction sensor according to a tenth embodiment of the present invention. In this figure, the same components as in the foregoing embodiments are denoted by the same reference numerals as in the foregoing embodiments. This embodiment is characterized by detecting pressing directions and pressing forces without a resistive film pattern.

As shown in FIG. 22, this pressing direction sensor includes the printed wiring board 10 and a pressing member (an operation unit) 22A. The pressing member 22A is made of a conductive pressure-sensitive material that has elasticity and a resistance value variable with pressures applied, such as conductive pressure-sensitive rubber. This pressing member 22A differs from the pressing member 22 shown in FIGS. 4A and 4B in that two protrusions (or three protrusions in the sectional view) facing the printed wiring board 10 are in contact with a pattern formed on the printed wiring board 10 in the stationary state.

Figure 23:
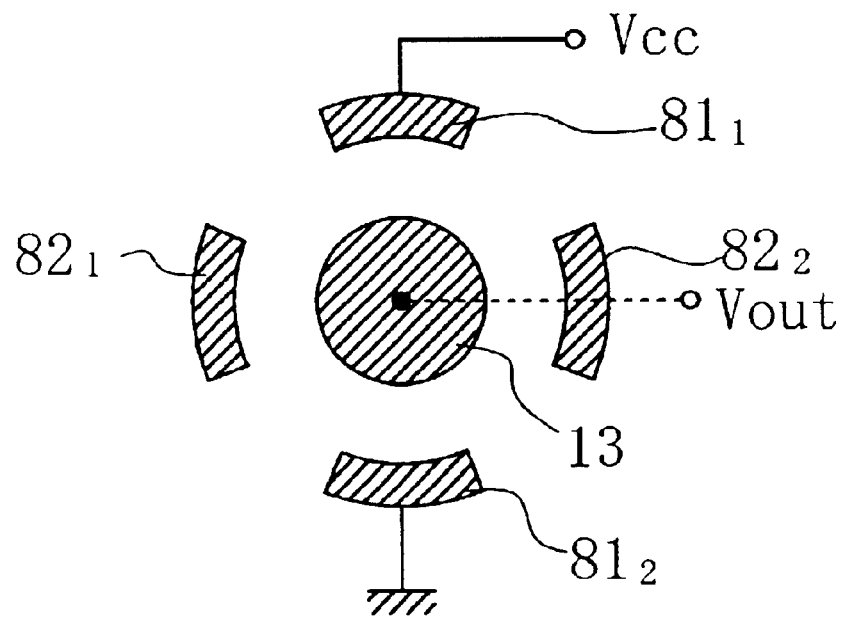
FIG. 23 illustrates a pattern formed on the printed wiring board of the pressing direction sensor shown in FIG. 22.

FIG. 23 shows the pattern formed on the printed wiring board 10. This pattern includes four electrode patterns $81_1$, $81_2$, $82_1$, and $82_2$, and an electrode pattern 13. The four electrode patterns $81_1$, $81_2$, $82_1$, and $82_2$ are shaped like a ring-like electrode that has been cut off by a predetermined length at regular intervals. In other words, the four electrode patterns $81_1$, $81_2$, $82_1$, and $82_2$ are arranged in a fan-like form at regular intervals of a predetermined angle. The electrode pattern 13 is positioned concentrically with the four electrode patterns $81_1$, $81_2$, $82_1$, and $82_2$. Being located at the center of the ring-like arrangement of the electrode patterns $81_1$, $81_2$, $82_1$, and $82_2$, the electrode 13 will be hereinafter referred to as the "center electrode pattern".

The electrode pattern $81_1$ is paired with the electrode pattern $81_2$, while the electrode pattern $82_1$ is paired with the electrode pattern $82_2$. A voltage Vcc is applied to the electrode pattern $81_1$, and the electrode pattern $81_2$ is grounded. Likewise, a voltage Vcc is applied to the electrode pattern $82_1$, and the electrode pattern $82_2$ is grounded, though not shown in FIG. 23.

Figure 24:
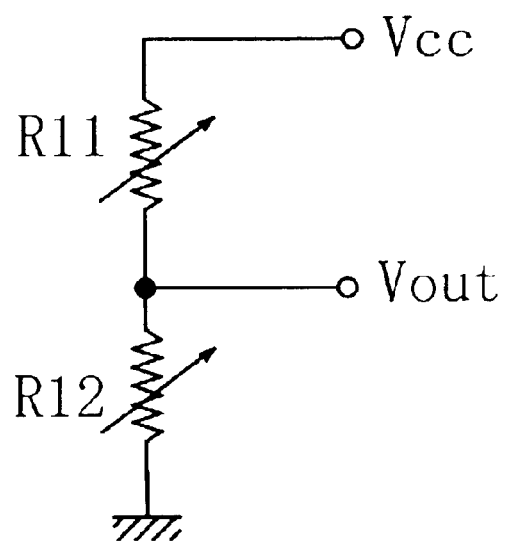
FIG. 24 illustrates a circuit formed between the electrode patterns shown in FIG. 23.

FIG. 24 shows a circuit formed between the electrode patterns $81_1$ and $81_2$. In this figure, a resistor R11 represents the resistance of the conductive pressing member 22A connecting the electrode pattern $81_1$ to the center electrode pattern 13, and a resistor R12 represents the resistance of the pressing member 22A connecting the center electrode pattern 13 to the pressing member 22A. A similar circuit is formed between the electrode patterns $82_1$ and $82_2$. In the stationary state shown in FIG. 22, the resistor R11 is equal to the resistor R12, and the detection voltage Vout of the center electrode pattern 13 is Vcc/2 accordingly. Here, a voltage is applied only to Vcc. When the pressing member 22A is pressed in any one direction, the pressed point is compressed, and the resistance value at the pressed point decreases. As a result, the detection voltage Vout changes. Since the detection voltage Vout varies with pressing forces, the pressing force can be detected from the detection voltage Vout. Likewise, when the voltage Vcc is applied to the electrode pattern $82_1$, the pressing force can be detected from the detection voltage Vout.

To detect the pressing direction, the voltage Vcc is first applied only to the electrode pattern $81_1$ so as to obtain the detection voltage Vout. The obtained detection voltage Vout indicates the pressed point located on the straight line connecting the electrode patterns $81_1$ and $81_2$. The voltage Vcc is next applied to the electrode pattern $82_1$ so as to obtain the detection voltage Vout. The obtained detection voltage Vout indicates the pressed point located on the straight line connecting the electrode patterns $82_1$ and $82_2$. The pressing direction can be detected from the two pressed points determined in this manner.

As described above, in accordance with the tenth embodiment of the present invention, a small and thin pressing direction sensor that can detect pressing directions and pressing forces can be realized with a very simple structure employing no resistive film patterns.

(Eleventh Embodiment)

Figure 25:
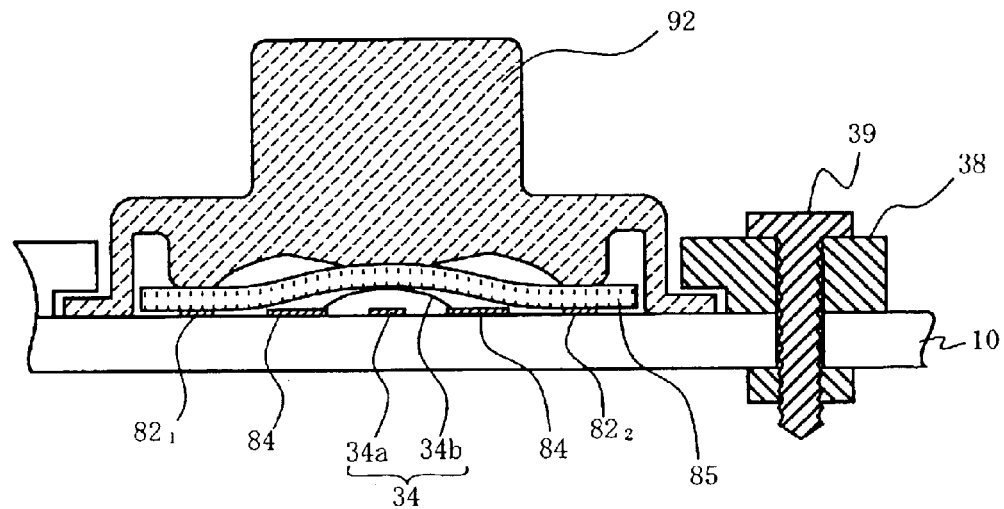
FIG. 25 is a sectional view of a pressing direction sensor according to an eleventh embodiment of the present invention.
Figure 26:
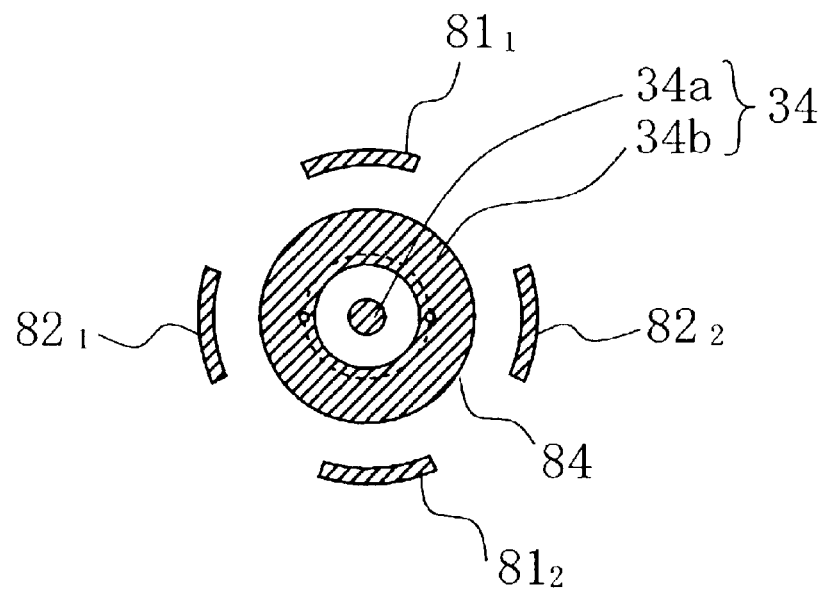
FIG. 26 illustrates a pattern formed on the printed wiring board of the pressing direction sensor shown in FIG. 25.

FIG. 25 is a sectional view of a pressing direction sensor according to an eleventh embodiment of the present invention. In this figure, the same components as in the foregoing embodiments are denoted by the same reference numerals as in the foregoing embodiments. FIG. 26 shows an electrode pattern formed on the printed wiring board 10.

The pressing direction sensor of this embodiment detects pressing directions and pressing forces, having the same principles as the tenth embodiment. This pressing direction sensor further includes the tactile switch 34 described with reference to FIG. 7. Also, a pressing member (an operation unit) 92 is employed instead of the pressing member 22A shown in FIG. 22, and a conductive pressure-sensitive rubber sheet 85 is employed in this pressing direction sensor. Further, a ring-like center electrode pattern 84 is employed instead of the round center electrode pattern 13 shown in FIG. 22.

As shown in FIG. 25, the ring-like center electrode pattern 84 surrounds the tactile switch 34. Also, the center electrode pattern 84 is arranged concentrically with the four electrode patterns $81_1$, $81_2$, $82_1$, and $82_2$. The ring-like conductive pressure-sensitive rubber sheet 85 having the same structure as shown in FIG. 9 is placed on the electrode patterns and the tactile switch 34. In the stationary state, the conductive pressure-sensitive rubber sheet 85 is in contact with two protrusions formed on the bottom surface of the pressing member 92. Also in the stationary state, the conductive pressure-sensitive rubber sheet 85 is in contact with the electrode patterns $81_1$, $81_2$, $82_1$, and $82_2$, as well as the elastic member 34b of the tactile switch 34.

Figure 27:
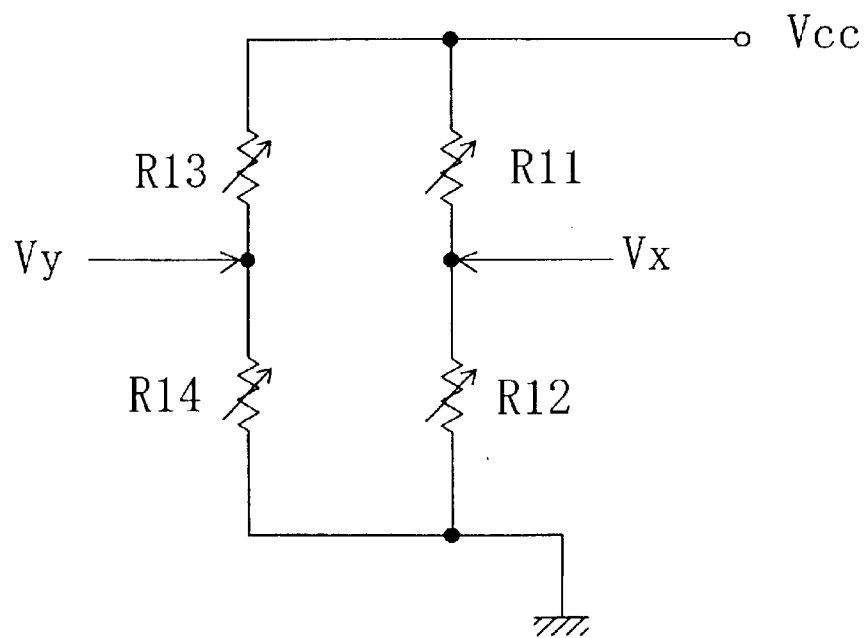
FIG. 27 illustrates the detection circuit of the pressing direction sensor according to the eleventh embodiment of the present invention.

FIG. 27 shows the detection circuit according to this embodiment. A resistor R11 represents the resistance of the conductive pressure-sensitive rubber sheet 85 between the electrode pattern $82_1$ and the center electrode pattern 84, and a resistor R12 represents the resistance of the conductive pressure-sensitive rubber sheet 85 between the center electrode pattern 84 and the electrode pattern $82_2$. Likewise, a resistor R13 represents the resistance of the conductive pressure-sensitive rubber sheet 85 between the electrode pattern $81_1$ and the center electrode pattern 84, and a resistor R14 represents the resistance of the conductive pressure-sensitive rubber sheet 85 between the center electrode pattern 84 and the electrode pattern $81_2$. Pressing directions and pressing forces can be detected from detection voltages Vx and Vy. As the pressing member 92 is pressed vertically downward, the tactile switch 34 is turned ON.

As described above, the pressing direction sensor according to the eleventh embodiment can detect pressing directions in the angle range of 360 degrees, as well as pressing forces. This pressing direction sensor can further detect the ON/OFF state corresponding to the vertical-direction operation. Furthermore, this pressing direction sensor has a small number of components, and accordingly is smaller and thinner than the conventional sensors.

(Twelfth Embodiment)

Figure 28:
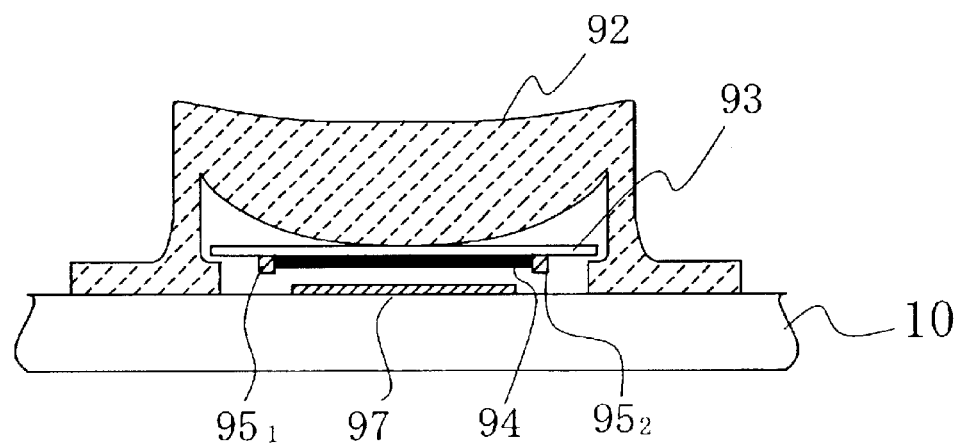
FIG. 28 is a sectional view of a pressing direction sensor according to a twelfth embodiment of the present invention.
Figure 29:
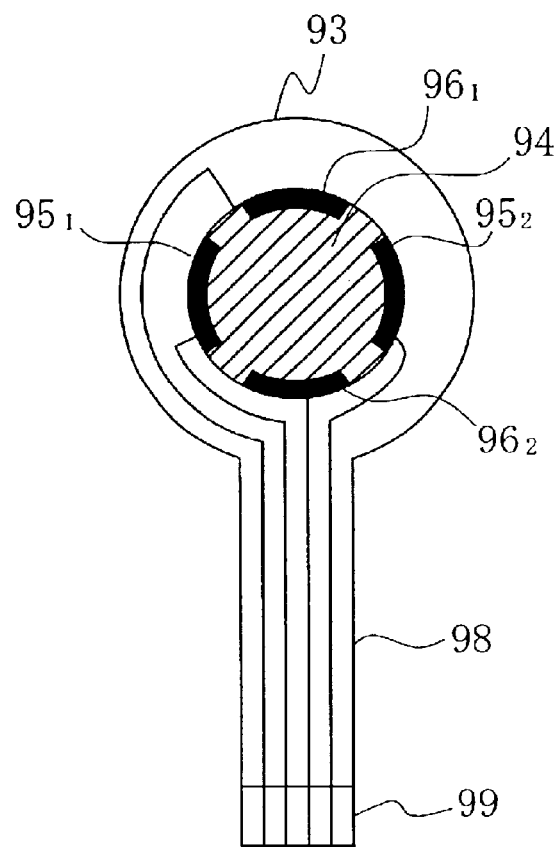
FIG. 29 illustrates a membrane sheet employed in the pressing direction sensor shown in FIG. 28.
Figure 30:
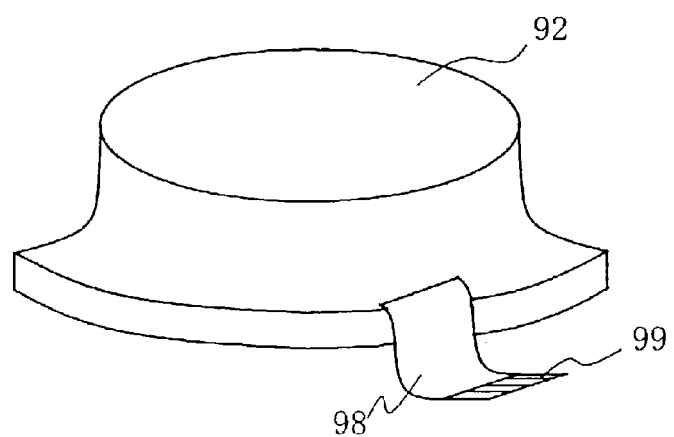
FIG. 30 is a perspective view illustrating the outlook of the pressing direction sensor shown in FIG. 28.

FIG. 28 is a sectional view of a pressing direction sensor according to a twelfth embodiment of the present invention. FIG. 29 illustrates a membrane sheet employed in the pressing direction sensor shown in FIG. 28. FIG. 30 is a perspective view of the outlook of the pressing direction sensor according to the twelfth embodiment. This pressing direction sensor can detect pressing directions and pressing forces. This embodiment is the same as the first through ninth embodiments in that a resistive film pattern is employed. This embodiment is also the same as the tenth and eleventh embodiments in that an x-coordinate position and a y-coordinate position are detected.

As shown in FIG. 28, the pressing member 92 is placed over the printed wiring board 10. In this embodiment, the pressing member 92 does not need to have conductivity. A step portion is formed inside the pressing member 92, and the edge portion of the membrane sheet 93 shown in FIG. 29 is engaged with and supported by the step portion. The membrane sheet 93 consists of a round part and a rectangular protruding part. A resistive film pattern 94 formed by carbon printing or the like, and electrode patterns $95_1$, $95_2$, $96_1$, and $96_2$, are formed on the round part of the membrane sheet 93. The resistive film pattern 94 has a round shape. The electrode patterns $95_1$ and $95_2$ face each other and form a pair. Likewise, the electrode patterns $96_1$ and $96_2$ face each other and form a pair. The electrode patterns $95_1$, $95_2$, $96_1$, and $96_2$ are formed on the resistive film pattern 94, and are electrically connected. The extraction electrodes of the electrode patterns $95_1$, $95_2$, $96_1$, and $96_2$ are formed on the protruding part of the membrane sheet 93, and the end portion 99 of the protruding part is a connecting portion for connection with the outside.

A center electrode pattern 97 is formed on the upper surface of the printed wiring board 10. This center electrode pattern 97 is a round-shaped pattern that is smaller than the round-shaped resistive film pattern 94 by the width of each of the electrode patterns $95_1$, $95_2$, $96_1$, and $96_2$.

In the stationary state, the resistive film pattern 94 is not in contact with the center electrode pattern 97. When the pressing member 92 is pressed in any one direction, the resistive film pattern 94 is brought into contact with the center electrode pattern 97. The pressing direction and pressing force detections are performed by applying a voltage to the two pairs of electrode patterns. More specifically, a voltage Vcc is first applied between the electrode patterns $95_1$ and $95_2$ so as to detect the x-coordinate value of the pressed point (or the pressing direction). At this point, the voltage value represents the pressing force. The same voltage Vcc is next applied to the electrode patterns $96_1$ and $96_2$ so as to detect the y-coordinate value. In this manner, the pressing direction and the pressing force of the pressing member 92 can be detected.

The voltage applying order may be controlled by a central processing unit described later. Also, the center electrode pattern 97 may be formed on the membrane sheet 93 instead of the printed wiring board 10, and the resistive film pattern 94 and the electrode patterns $95_1$, $95_2$, $96_1$, and $96_2$, may be formed on the printed wiring board 10 instead of the membrane sheet 93. It is also possible to form the resistive film pattern 94 on the printed wiring board 10, and to form only electrode patterns on the membrane sheet 93 by Ag printing or the like.

(Thirteenth Embodiment)

Figure 31:
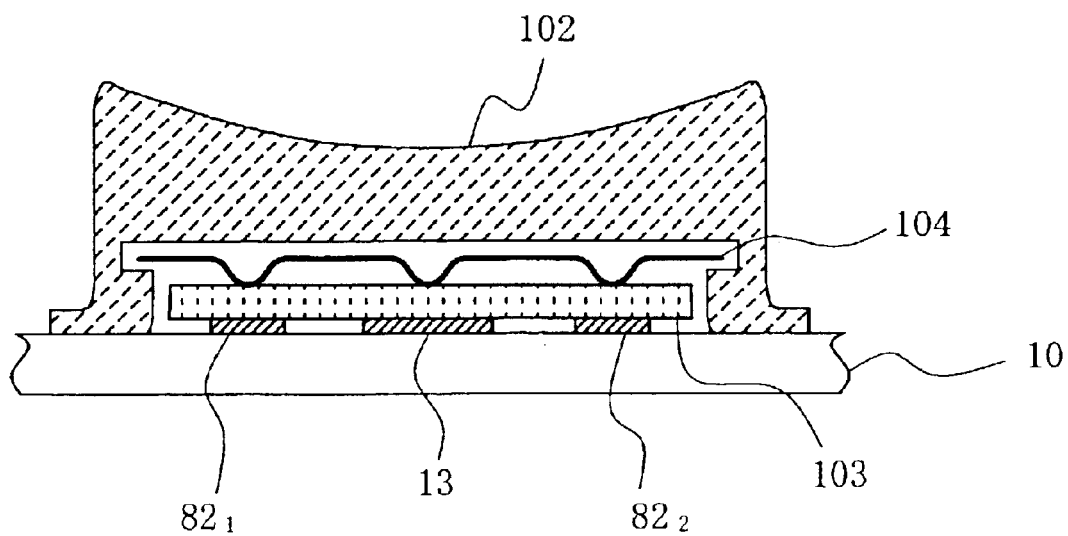
FIG. 31 is a sectional view of a pressing direction sensor according to a thirteenth embodiment of the present invention.

FIG. 31 is a sectional view of a pressing direction sensor according to a thirteenth embodiment of the present invention. In this figure, the same components as in the foregoing embodiments are denoted by the same reference numerals as in the foregoing embodiments. This embodiment is to detect pressing directions and pressing forces by the same principles as the tenth and eleventh embodiments, and accordingly is a modification of the tenth and eleventh embodiments.

The center electrode 13 and the four electrode patterns $81_1$, $81_2$, $82_1$, and $82_2$, are arranged on the printed wiring board 10 in the same manner as in FIG. 23. In FIG. 31, only two of the electrode patterns $82_1$ and $82_2$ can be seen. A round-shaped conductive pressure-sensitive rubber sheet 103 is placed over the center electrode pattern 13 and the four electrode patterns $81_1$, $81_2$, $82_1$, and $82_2$. In the stationary state, this conductive pressure-sensitive rubber sheet 103 is in contact with the center electrode pattern 13 and the four electrode patterns $81_1$, $81_2$, $82_1$, and $82_2$. A metal plate 104 is placed over the conductive pressure-sensitive rubber sheet 103. This metal plate 104 has two ring-like protrusions (three protrusions in the sectional view). The outer ring-like protrusion may be a complete ring, or four separate portions corresponding to the four electrode patterns $81_1$, $81_2$, $82_1$, and $82_2$. The metal plate 104 and the conductive pressure-sensitive rubber sheet 103 are accommodated in a concave portion formed on the bottom surface of a pressing member 102.

When the pressing member 102 is pressed in any one direction, the bottom surface of the pressing member 102 presses the metal plate 104. The concave portion of the metal plate 104 then presses the conductive pressure-sensitive rubber sheet 103. As a result, the conductive pressure-sensitive rubber sheet is compressed at the pressed point, and the resistance value thereof decreases. Under these conditions, the coordinates of the pressed point in the x-axis direction and the y-axis direction are detected in the above described manner, so as to detect the pressing direction and the pressing force.

It should be noted that the combination of the pressing member 102 and the metal plate 104 is not limited to this embodiment, but is applicable to any of the foregoing embodiments.

Figure 32:
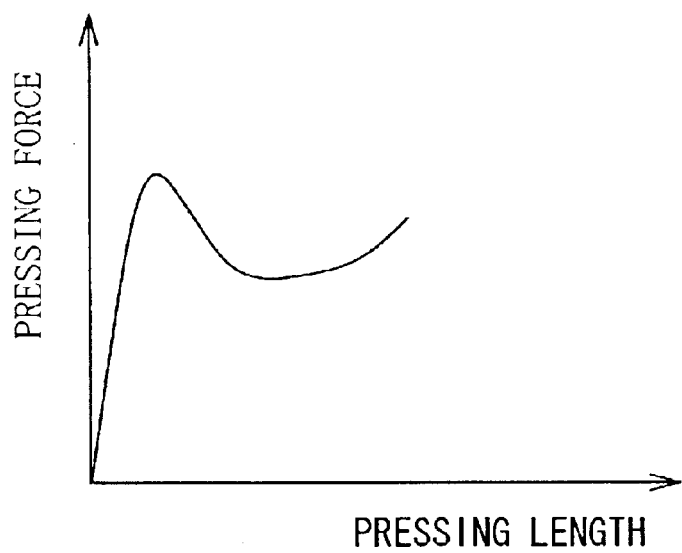
FIG. 32 is a graph illustrating the relationship between the pressed length and the pressing force of a pressing member.

Also, in any of the foregoing embodiments, the pressing member may be formed so as to realize the relationship between the pressed length and the pressing force as shown in FIG. 32. By forming the pressing member in this manner, a clicking feeling can be felt when the pressing member is pressed, and thus the pressing member, which serves as the switch for pressing operations perpendicular to the wiring board, can provide a pleasant feeling in handling.

(Other Embodiments)

Figure 33:
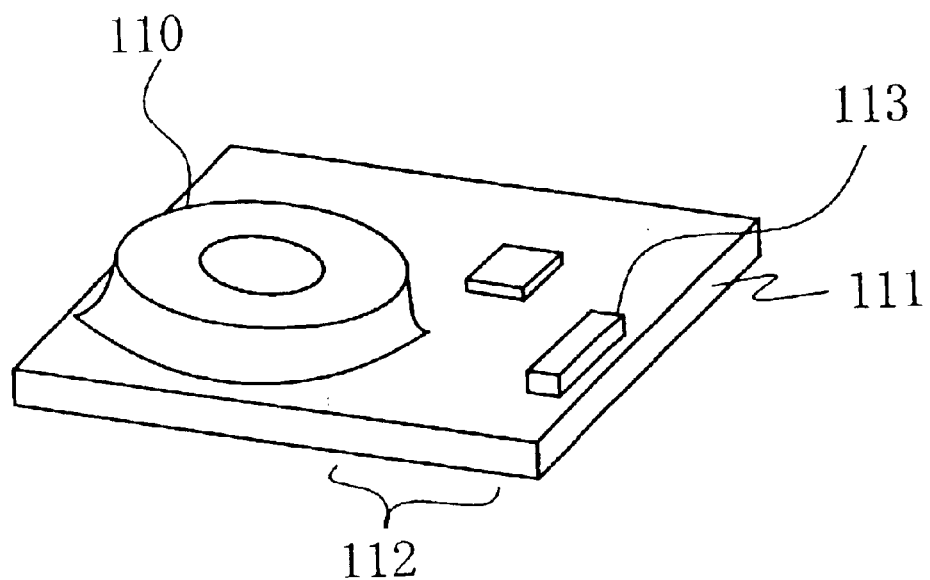
FIG. 33 illustrates an example of an electronic device having a pressing direction sensor according to the present invention on a printed wiring board.

FIG. 33 illustrates an example of an electronic device having a pressing direction sensor of the present invention on a printed wiring board. More specifically, this electronic device is provided with a pressing direction sensor 110, a signal processing circuit 112, and a connector 113 for outer connection, all of which are placed on a printed wiring board 111. The pressing direction sensor 110 is a pressing direction sensor according to the twelfth embodiment of the present invention, but of course may be a pressing direction sensor according to any of the other foregoing embodiments.

Figure 34:
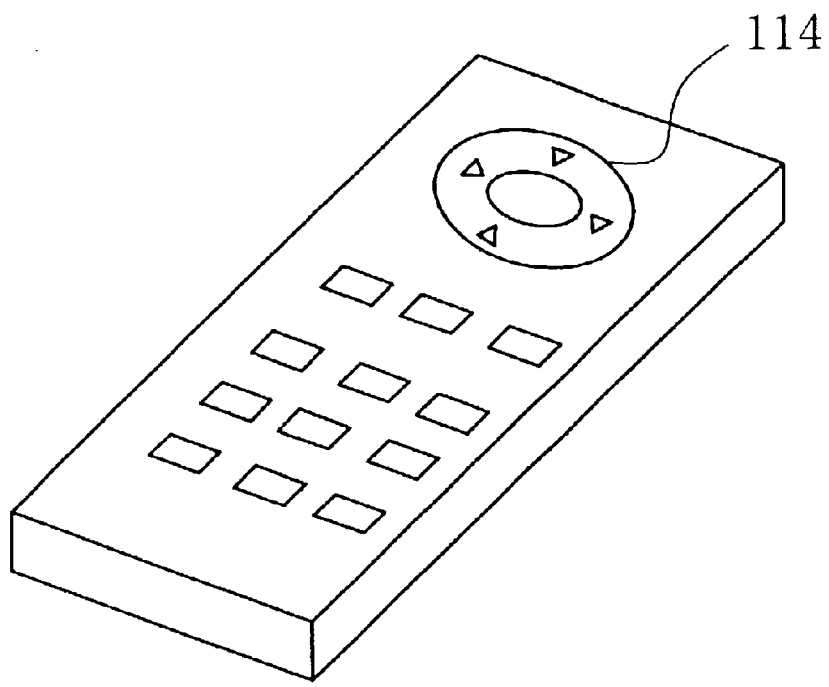
FIG. 34 illustrates another example of an electronic device.

FIG. 34 illustrates an electronic device according to yet another embodiment of the present invention. This electronic device may be used for a pointing device, a printed wiring board, a remote control device, and a portable telephone. In the structure shown in FIG. 34, a pressing direction sensor pattern and a plurality of switch contact patterns are formed on a printed wiring board. An operation unit (a pressing member) 114 for detecting pressing directions, and a plurality of switch rubber contacts that are integrally molded out of an elastomeric material, are placed over those patterns, and are covered and pressed with a mold cover.

Figure 35:
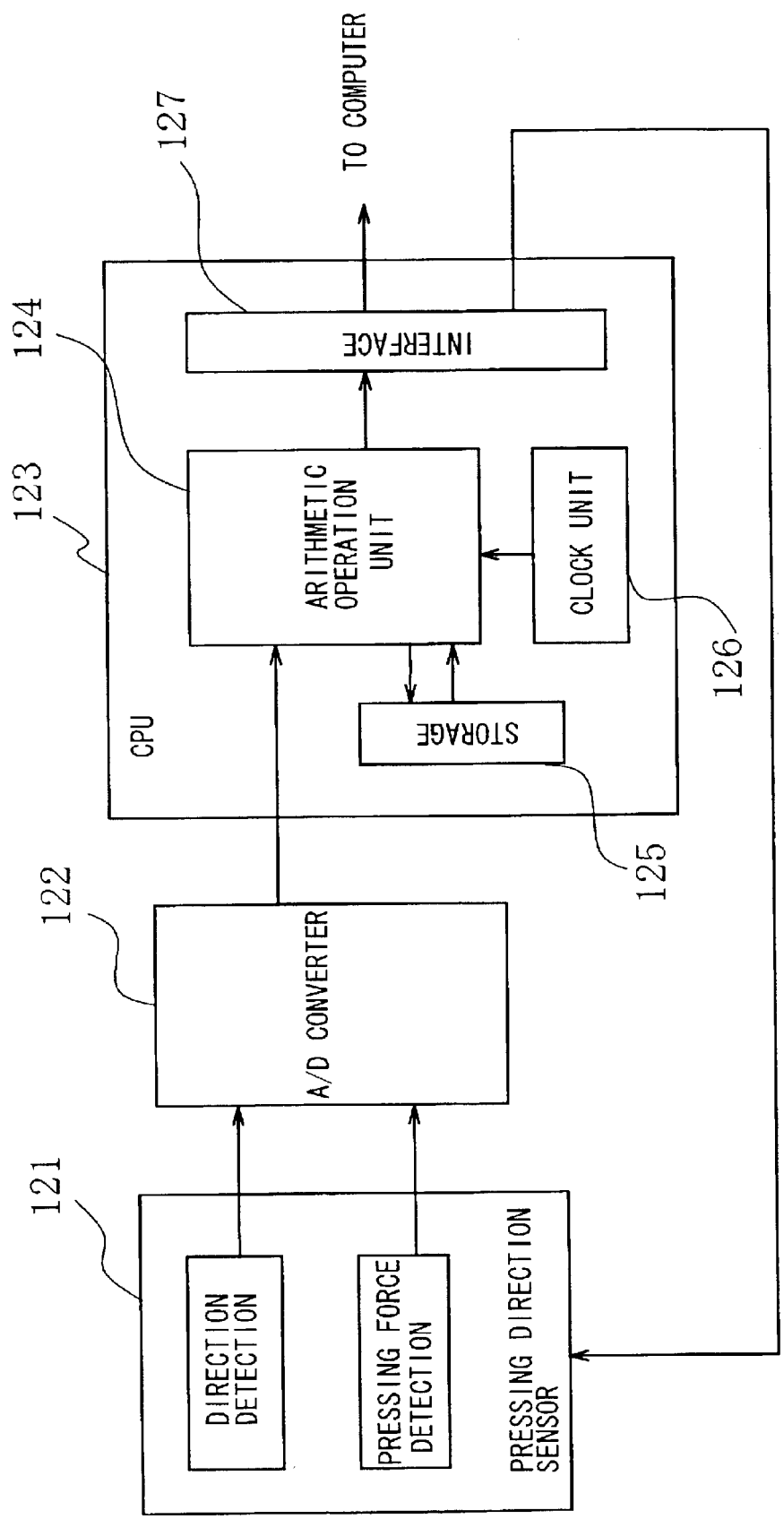
FIG. 35 is a block diagram illustrating an example of the inner structure of an electronic device.

FIG. 35 is a block diagram illustrating an example of the inner structure of the above electronic device. This structure includes a pressing direction sensor 121, an analog-digital converter 122, and a central processing unit 123. The central processing unit 123 includes a storage unit 125, an arithmetic operation unit 124, a clock unit 126 that generates clocks, and an interface unit 127. The pressing direction sensor 121 is equivalent to the pressing direction sensor 110 shown in FIG. 33, for example, and the analog-digital converter 122 and the central processing unit 123 are equivalent to the signal processing circuit 112. The connector 113 for outer connection shown in FIG. 33 is to be connected to the interface unit 127 of the central processing unit 123 shown in FIG. 35.

The central processing unit 123 controls the pressing direction sensor 121, and processes the output voltage of the pressing direction sensor 121.

As described so far, in accordance with the present invention, a small and thin pressing direction sensor that can continually detect pressing directions in the angle range of 360 degrees. The present invention also provides a pressing direction sensor that can detect pressing forces as well as pressing directions. Furthermore, the present invention can provide various electronic devices that employ the above pressing direction sensor.

Finally, several aspects of the invention are summarized below for reference.

According to an aspect, there is provided a pressing direction sensor comprising: a ring-like resistive film pattern; a first electrode pattern; and a conductive member that is electrically connected to the resistive film pattern and the first electrode pattern when pressed, the potential of the resistive film pattern at the point of contact of the conductive member with the resistive film pattern being outputted from the first electrode pattern, so as to detect a pressing direction. The potential of the resistive film pattern at the point at which the conductive member contacts the resistive film pattern depends on the resistance value of the resistive film pattern available at the point. Thus, the pressing direction can be detected by the potential of the point via the first electrode pattern.

The pressing direction sensor may be configured so that it further includes a second electrode pattern; the conductive member being a conductive pressure-sensitive member that has a resistance value variable with pressures applied; the conductive member being brought into contact with the first and second electrode patterns when pressed; and a signal generated from the contact of the pressed conductive member with the first and second electrode patterns being outputted so as to detect a pressing force. The conductive pressure-sensitive member has a resistance value that depends on pressure. Thus, the voltage developing across the first and second electrode patterns reflects the pressure. It is therefore possible to detect the pressure from the voltage developing across the first and second electrode patterns.

The pressing direction sensor may be configured so that: the resistive film pattern has a notch formed by cutting a part off a ring-like pattern; and a voltage is applied via two facing ends formed by the notch of the resistive film pattern. Current flows in the resistive film pattern from one of the two facing ends to the other. Under this condition, when the conductive member is pressed, contact is made between the ring-like resistive film pattern and the first electrode pattern. The pressing direction can be detected by outputting the potential of the point at which the conductive member contacts the resistive film pattern via the first electrode pattern.

The pressing direction sensor may be configured so that: the resistive film pattern has a ring-like shape; and extraction electrodes to be connected to the resistive film pattern are arranged around the resistive film pattern at regular intervals of 90 degrees. A voltage is applied across the facing extraction electrodes. This results in current that flows from one of the facing extraction electrodes to the other via the resistive film pattern. Under this condition, when the conductive member contacts the resistive film pattern, the potential of the first electrode results from the resistance value of the resistive film pattern available at the contact point.

The pressing direction sensor may be configured so that the first electrode pattern is arranged concentrically with the resistive film pattern.

The pressing direction sensor may be configured so that the first electrode pattern has either a round shape or a ring-like shape arranged concentrically with the resistive film pattern.

The pressing direction sensor may be configured so that: the resistive film pattern has a notch formed by cutting a part off a ring-like pattern; and a separate electrode pattern is interposed between two facing ends formed by the notch. When the conductive member contacts the separate electrode patterns, the facing ends of the resistive film pattern are connected via the conductive member. At this time, the separate electrode pattern becomes a particular potential. It is therefore possible to detect the potential of the separate electrode pattern so as to detect the direction of the location of the separate electrode pattern.

The pressing direction sensor may be configured so that it further includes a substrate, the first electrode pattern and the resistive film pattern being formed on the substrate, and the conductive member facing the substrate.

The pressing direction sensor may be configured, so that: the conductive member is interposed between the resistive film pattern and the first electrode pattern; and an operation unit is further provided so as to bring the resistive film pattern into contact with the first electrode pattern via the conductive member when the operation unit is pressed.

The pressing direction sensor may be configured so that it further comprises a sheet-like member that supports the resistive film pattern and the first electrode pattern, the conductive member being sandwiched by the sheet-like member, and the operation unit being placed at one side of the sheet-like member.

The pressing direction sensor may be configured so that it further includes: a sheet-like member that supports the resistive film pattern, the first electrode pattern, and the second electrode pattern; and an operation unit that serves to bring the resistive film pattern, the first electrode pattern, and the second electrode pattern into contact with one another, with the conductive member being sandwiched by the sheet-like member.

The pressing direction sensor may be configured so that it further includes a switch that is turned on when the conductive member is pressed vertically downward. It is therefore possible to realize the pressing direction sensor equipped with the switch function in addition to detection of the pressing direction and/or pressure.

The pressing direction sensor may be configured so that the conductive member has a resistance value variable with pressures applied. The pressure can be sensed by utilizing change of the resistance value.

The pressing direction sensor may be configured so that the conductive member includes a ring-like conductive pressure-sensitive rubber that has a resistance value variable with pressures applied. The ring-line conductive pressure-sensitive rubber is one example of the conductive member. The pressure can be sensed by utilizing change of the resistance value.

The pressing direction sensor may be configured so that it further includes an operation unit that presses the conductive member.

The pressing direction sensor may be configured so that it further includes a circuit for applying a voltage to the resistive film pattern after a signal is outputted from the second electrode pattern. The voltage is applied to the resistive film pattern after pressing. It is therefore possible to prevent current from being consumed wastefully.

The pressing direction sensor may be configured so that: an extraction electrode is provided at a predetermined position with respect to the resistive film pattern; and the potential of the extraction electrode is set as a reference potential for detecting a pressing direction. This improves the detection accuracy.

The pressing direction sensor may be configured so that the potential of the second electrode pattern is compared with a predetermined threshold value, so as to determine whether the conductive member has been pressed vertically downward. It is thus possible to achieve the pressing direction sensor equipped with the switch function in addition to detection of the pressing direction and/or pressure.

According to another aspect of the present invention, there is provided a pressing direction sensor comprising: a center electrode pattern; a plurality of pairs of electrode patterns, the electrode patterns of each pair facing each other, with the center electrode pattern existing therebetween; and a conductive pressure-sensitive member that is in contact with the plurality of pairs of electrode patterns in the stationary state, and has a resistance value variable with pressures applied, a pressing direction and a pressing force of the conductive pressure-sensitive member being detected from a signal obtained from the center electrode pattern when the conductive pressure-sensitive member is pressed. This sensor can sense the pressing direction and pressure without the resistive film pattern. When pressed, the potential of the center electrode pattern changes from the potential available in the stationary state. The pressure can be detected by the potential change. Voltages are applied to the respective pairs of electrode patterns. Thus, the center electrode pattern becomes at the potential that reflects the coordinates position of the pressing point on the lines connecting the pairs of electrode patterns. Thus, the position of the pressing point, namely, the pressing direction can be obtained from the potentials of the center electrode patterns obtained for the respective pairs.

The pressing direction sensor may be configured so that: the center electrode pattern has a ring-like shape; and a switch that is turned on when the conductive member is pressed vertically downward is provided at the center of the center electrode pattern. It is thus possible to realize the sensor equipped with the switch function in addition to detection of the pressing direction and/or pressure.

According to another aspect of the present invention, there is provided a pressing direction sensor comprising: a round-shaped resistive film pattern; a plurality of pairs of electrode patterns that are arranged along the outer circumference; and a center electrode pattern that is electrically connected to the resistive film pattern through a pressing operation, a pressing direction and a pressing force being detected from a signal obtained from the center electrode pattern. The center electrode pattern becomes at the potential that reflects the coordinates position of the pressing point on the lines connecting the pairs of electrode patterns. Thus, the position of the pressing point, namely, the pressing direction can be obtained from the potentials of the center electrode patterns obtained for the respective pairs. According to yet another aspect of the present invention, there is provided an electronic device comprising: a pressing direction sensor; and a signal processing circuit that processes an output signal from the pressing direction sensor, the pressing direction sensor is configured as described above. Examples of this electronic device are pointing devices, printed-circuit boards, remote controllers and portable phones.

Although a few preferred embodiments of the present invention have been shorn and described, it would be appreciated by those skilled in the art that changes may be made in these embodiments without departing from the principles and spirit of the invention, the scope of which is defined in the claims and their equivalents.

What is claimed is:

1. A pressing direction sensor comprising:
   a ring-like resistive film pattern having two ends between which a given voltage is applied;
   a first electrode pattern; and
   a conductive member that is electrically connected to the resistive film pattern and the first electrode pattern when pressed,
   the potential of the resistive film pattern at the point of contact of the conductive member with the resistive film pattern being outputted from the first electrode pattern, so as to detect a pressing direction.

2. The pressing direction sensor as claimed in claim 1, further comprising a second electrode pattern,
   the conductive member being a conductive pressure-sensitive member that has a resistance value variable with pressures applied,
   the conductive member being brought into contact with the first and second electrode patterns when pressed, and
   a signal generated from the contact of the pressed conductive member with the first and second electrode patterns being outputted so as to detect a pressing force.

3. The pressing direction sensor as claimed in claim 1, wherein:
   the resistive film pattern has a notch formed by cutting a part off a ring-like pattern; and
   a voltage is applied via two facing ends formed by the notch of the resistive film pattern.

4. The pressing direction sensor as claimed in claim 1, wherein:
   the resistive film pattern has a ring-like shape; and
   extraction electrodes to be connected to the resistive film pattern are arranged around the resistive film pattern at regular intervals of 90 degrees.

5. The pressing direction sensor as claimed in claim 1, wherein the first electrode pattern is arranged concentrically with the resistive film pattern.

6. The pressing direction sensor as claimed in claim 1, wherein the first electrode pattern has either a round shape or a ring-like shape arranged concentrically with the resistive film pattern.

7. The pressing direction sensor as claimed in claim 1, wherein:
   the resistive film pattern has a notch formed by cutting a part off a ring-like pattern; and
   a separate electrode pattern is interposed between two facing ends formed by the notch.

8. The pressing direction sensor as claimed in claim 7, wherein the potential of the separate electrode pattern is detected so as to detect the direction of the location of the separate electrode pattern.

9. The pressing direction sensor as claimed in claim 1, further comprising a substrate,
   the first electrode pattern and the resistive film pattern being formed on the substrate, and
   the conductive member facing the substrate.

10. The pressing direction sensor as claimed in claim 1, wherein:
    the conductive member is interposed between the resistive film pattern and the first electrode pattern; and
    an operation unit is further provided so as to bring the resistive film pattern into contact with the first electrode pattern via the conductive member when the operation unit is pressed.

11. The pressing direction sensor as claimed in claim 10, further comprising a sheet-like member that supports the resistive film pattern and the first electrode pattern,
    the conductive member being sandwiched by the sheet-like member, and
    the operation unit being placed at one side of the sheet-like member.

12. The pressing direction sensor as claimed in claim 2, further comprising:
    a sheet-like member that supports the resistive film pattern, the first electrode pattern, and the second electrode pattern; and
    an operation unit that serves to bring the resistive film pattern, the first electrode pattern, and the second electrode pattern into contact with one another, with the conductive member being sandwiched by the sheet-like member.

13. The pressing direction sensor as claimed in claim 1, further comprising a switch that is turned on when the conductive member is pressed vertically downward.

14. The pressing direction sensor as claimed in claim 1, wherein the conductive member has a resistance value variable with pressures applied.

15. The pressing direction sensor as claimed in claim 1, wherein the conductive member includes a ring-like conductive pressure-sensitive rubber that has a resistance value variable with pressures applied.

16. The pressing direction sensor as claimed in claim 1, further comprising an operation unit that presses the conductive member.

17. The pressing direction sensor as claimed in claim 2, further comprising a circuit for applying a voltage to the resistive film pattern after a signal is outputted from the second electrode pattern.

18. The pressing direction sensor as claimed in claim 1, wherein:

an extraction electrode is provided at a predetermined position with respect to the resistive film pattern; and the potential of the extraction electrode is set as a reference potential for detecting a pressing direction.

19. The pressing direction sensor as claimed in claim 2, wherein the potential of the second electrode pattern is compared with a predetermined threshold value, so as to determine whether the conductive member has been pressed vertically downward.

* * * * *